United States Patent

[11] 3,613,080

[72] Inventors John A. Angeloni, Sr.
Norristown;
John McIntyre, Ardsley; Ronald L.
Baracka, Ambler, all of Pa.

[21] Appl. No. 774,280
[22] Filed Nov. 8, 1968
[45] Patented Oct. 12, 1971
[73] Assignee Scan-Data Corporation
Norristown, Pa.

[54] CHARACTER RECOGNITION SYSTEM UTILIZING FEATURE EXTRACTION

5 Claims, 31 Drawing Figs.

[52] U.S. Cl. .......... 340/146.3AC
[51] Int. Cl. .......... G06k 9/12
[50] Field of Search .......... 340/146.3

[56] References Cited

UNITED STATES PATENTS

| | | | |
|---|---|---|---|
| 3,069,079 | 12/1962 | Steinbuch et al. .......... | 340/146.3 X |
| 3,167,745 | 1/1965 | Bryan et al. .......... | 340/146.3 |
| 3,234,513 | 2/1966 | Brust .......... | 340/146.3 |
| 3,264,608 | 8/1966 | Gattner et al. .......... | 340/146.3 |
| 3,293,604 | 12/1966 | Klein et al. .......... | 340/146.3 |
| 3,370,271 | 2/1968 | Van Dalen et al. .......... | 340/146.3 |
| 3,305,835 | 2/1967 | Beltz .......... | 340/146.3 J |
| 3,496,541 | 2/1970 | Haxby et al. .......... | 340/146.3 |
| 3,506,807 | 4/1970 | Malaby .......... | 340/146.3 AH |
| 3,517,387 | 6/1970 | Andrews et al. .......... | 340/146.3 R |

*Primary Examiner*—Maynard R. Wilbur
*Assistant Examiner*—Leo H. Boudreau
*Attorney*—Caesar, Rivise, Bernstein & Cohen

ABSTRACT: A character recognition system having a shift register including a plurality of stages for serially storing and shifting a binary quantization of a character pattern sampled within a field on a document. Means are provided for recognizing a character in the register. The means comprise a plurality of subfeature masks each of which is responsive to a different combination of stages of the shift register. The feature masks are connected only to selected ones of the stages of the shift register which correspond to an area of the field. The selected stages of the register form a window through which each of the features in a character pass, a plurality of feature detectors each responsive to a different combination of subfeature masks are provided to detect the features present in a character pattern as they pass through the window.

INVENTORS.
JOHN A. ANGELONI, SR.
RONALD L. BARACKA
JOHN J. McINTYRE
BY
Caesar, Rivise, Bernstein & Cohen
ATTORNEYS.

INVENTORS.
JOHN A. ANGELONI, SR.
RONALD L. BARACKA
JOHN J. McINTYRE
BY
Caesar, Rivise, Bernstein & Cohen
ATTORNEYS.

INVENTORS
JOHN A. ANGELONI, SR.
RONALD L. BARACKA
JOHN J. McINTYRE
BY
Caesar, Rivise, Bernstein & Cohen
ATTORNEYS.

INVENTORS.
JOHN A. ANGELONI, SR.
RONALD L. BARACKA
JOHN J. McINTYRE
BY
Caesar, Rivise, Bernstein & Cohen
ATTORNEYS INVENTORS.
JOHN A. ANGELONI, SR.
RONALD L. BARACKA
JOHN J. McINTYRE
BY
Caesar, Rivise, Bernstein & Cohen
ATTORNEYS.

INVENTORS.
JOHN A. ANGELONI, SR.
RONALD L. BARACKA
JOHN J. McINTYRE
BY
Caesar, Rivise, Bernstein & Cohen
ATTORNEYS.

INVENTORS
JOHN A. ANGELONI, SR.
RONALD L. BARACKA
JOHN J. McINTYRE
BY
Caesar, Rivise, Bernstein & Cohen
ATTORNEYS INVENTORS
JOHN A. ANGELONI, SR.
RONALD L. BARACKA
JOHN J. McINTYRE
BY
Caesar, Rivise, Bernstein & Cohen
ATTORNEYS INVENTORS.
JOHN A. ANGELONI, SR.
RONALD L. BARACKA
JOHN J. McINTYRE
BY
Caesar, Rivise, Bernstein & Cohen
ATTORNEYS.

INVENTORS.
JOHN A. ANGELONI, SR.
RONALD L. BARACKA
JOHN J. McINTYRE
BY
Caesar, Rivise, Bernstein & Cohen
ATTORNEYS.

INVENTORS.
JOHN A. ANGELONI, SR.
RONALD L. BARACKA
JOHN J. McINTYRE
BY
Caesar, Rivise, Bernstein & Cohen
ATTORNEYS INVENTORS.
JOHN A. ANGELONI, SR.
RONALD L. BARACKA
JOHN J. McINTYRE
BY
Caesar, Rivise, Bernstein & Cohen
ATTORNEYS.

CHARACTER RECOGNITION SYSTEM UTILIZING FEATURE EXTRACTION

This invention relates to a character recognition system and more particularly to a method and apparatus for extracting the features which form a character.

Conventional character recognition systems typically utilize character masks which are connected to a shift register which serially stores the quantization of a character pattern. The shift register is typically of a size having a number of stages equal to the number of positions in a scan raster or field that are sampled. The size of the scan raster is normally fixed both vertically and horizontally so that during each complete raster both a fixed height as well as a fixed width of area is scanned in accordance with normalization and other factors relating to the size and location of the characters to be scanned.

Registration of a character in the conventional system is made when a plurality of features is simultaneously sensed in a character pattern. That is, when features are recognized which are in fixed relation to other features of a specific character that is to be recognized, and these features form the necessary elements of a character, that specific character is recognized.

The disadvantages inherent in the conventional system are as follows:

1. If the features in a character pattern do not happen to be within a fixed relation with respect to each other, the character will be shifted through the shift register without being recognized.
2. The recognition capabilities are not powerful enough since the absence of a feature or a variance in the relation of the feature precludes recognition of a character. Therefore, there is little room for variance in characters when distinguishing between characters having many like features and only small dissimilarities.
3. The character recognition circuitry is inefficient and expensive in that there is much duplication of circuitry since each feature of each character requires a different detection mask which is provided in fixed relation to the remaining feature masks for each specific character for which it is provided. This requires duplication of feature masks for features which are present in many characters but in different relationship to the remaining portions of the character.
4. Where a document has lines of type which are skewed (not perfectly horizontal), characters at the end of a line often lie outside the field of the scanning pattern.

Because of the aforementioned disadvantages, a character recognition system cannot cope with proportional type fonts and is slowed during the character recognition process due to the fixed scan of the scanning raster in that the character scan often overlaps more than one character thereby requiring the scanning means to retrace the beginning of a character which was overlapped in a previous scan. Moreover, where a character at the end of a line falls outside a scan because the line is skewed, the character must be located by the computer in association with the document scanner and be scanned again.

It is therefore an object of the invention to provide a new and improved feature extraction method and apparatus which overcomes the aforementioned disadvantages.

Another object of the invention is to provide a new and improved feature extraction system which utilizes a window in the shift register for detection of features as the character pattern is shifted through the window.

Another object of the invention is to provide a new and improved character recognition system which utilizes subfeature masks to extract features independently of each other so that the interdependence of one feature upon another is completely eliminated.

Yet another object of the invention is to provide a new and improved feature extraction system which is more powerful than previously known feature extraction systems.

Yet another object of the invention is to provide a new and improved character recognition system which is less expensive yet which has greater flexibility than prior systems.

Still another object of the invention is to provide a character recognition system which enables the scanner to follow a line of type even where it is skewed.

These and other objects of the invention are achieved by providing a feature extraction system which utilizes a scanning pattern of an indeterminate width. As the scanning pattern is serially shifted through the binary shift register, a portion of the shift register forming a window is constantly being sensed by a plurality of subfeature masks which are in turn connected to feature detectors that are responsive during predetermined periods to extract features as they pass the window.

As specific features of a character are detected, registers store the features until specific combinations of features which form a character are present and specific features of other characters are not present whereby the logic of the system determines that a character has been detected. As soon as this condition occurs (i.e. a character is recognized), the feature registers are erased and the scanning pattern continues right into the next character pattern thereby requiring no loss of time as the next character is sensed for registration. The features are extracted independently of each other and the storage registers store the features until all of the necessary features of a character have passed through the shift register window. Thus, both regular and proportional type can be read with this system and an irregularity in a character does not prevent recognition of the character.

In accordance with the invention, a character recognition system is provided having a shift register with a plurality of stages for serially storing and shifting a binary quantization of a character pattern sampled within a field on a document. Means are provided for recognizing a character in the register. The means comprise a plurality of subfeature masks each of which is responsive to a different combination of stages of the shift register. The feature masks are connected only to selected ones of the stages of the shift register which correspond to an area of the field, which form a window through which each of the features in a character pass. A plurality of feature detectors each responsive to a different combination of subfeature masks are provided to detect the features present in a character pattern as they pass through the window.

Other objects and many of the attendant advantages of the present invention will be more readily appreciated as the same becomes better understood by reference to the accompanying drawings wherein.

Figures 7A, 8A:
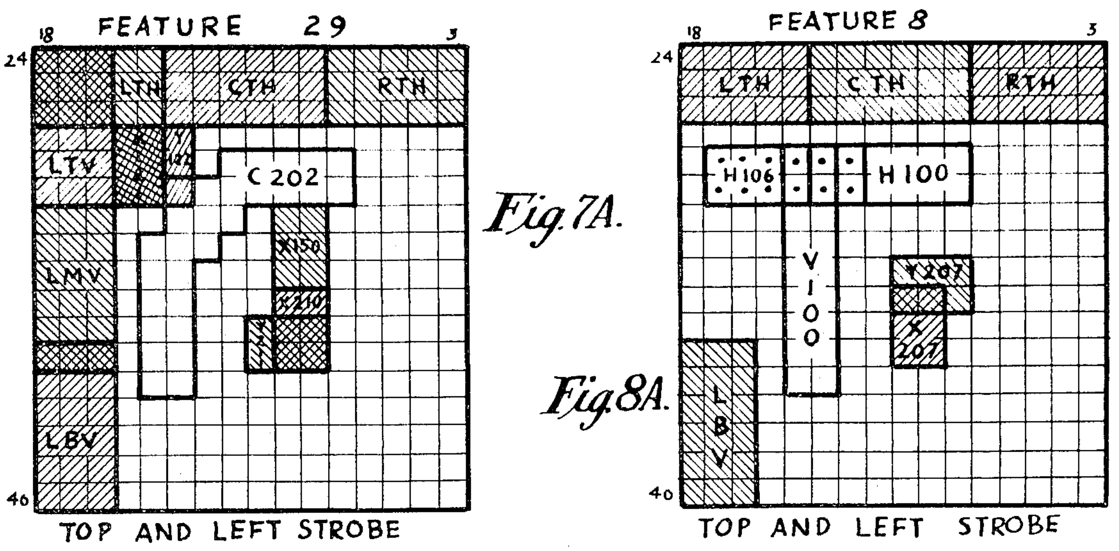
Figure 7B:
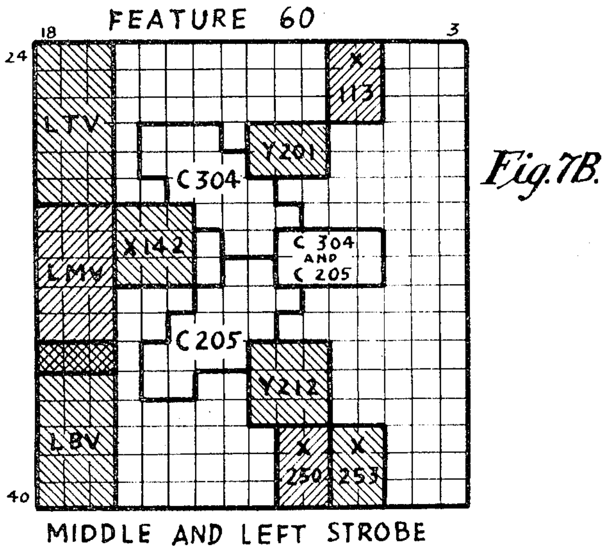
Figure 8B:
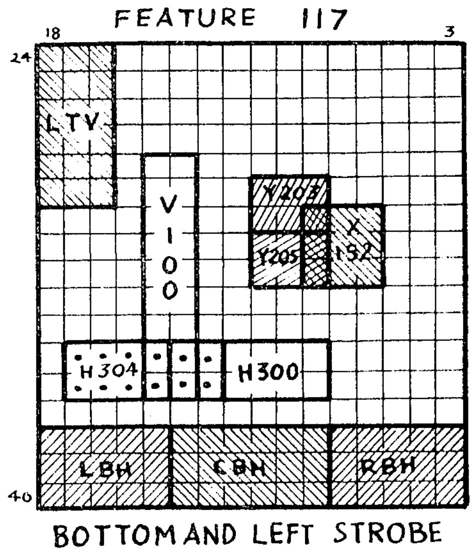
Figure 7C:
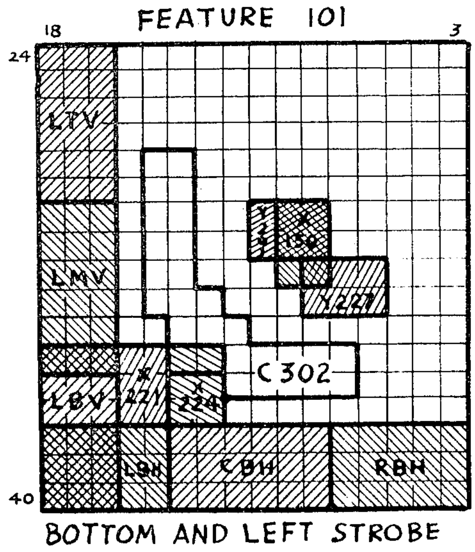
Figures 9, 10:
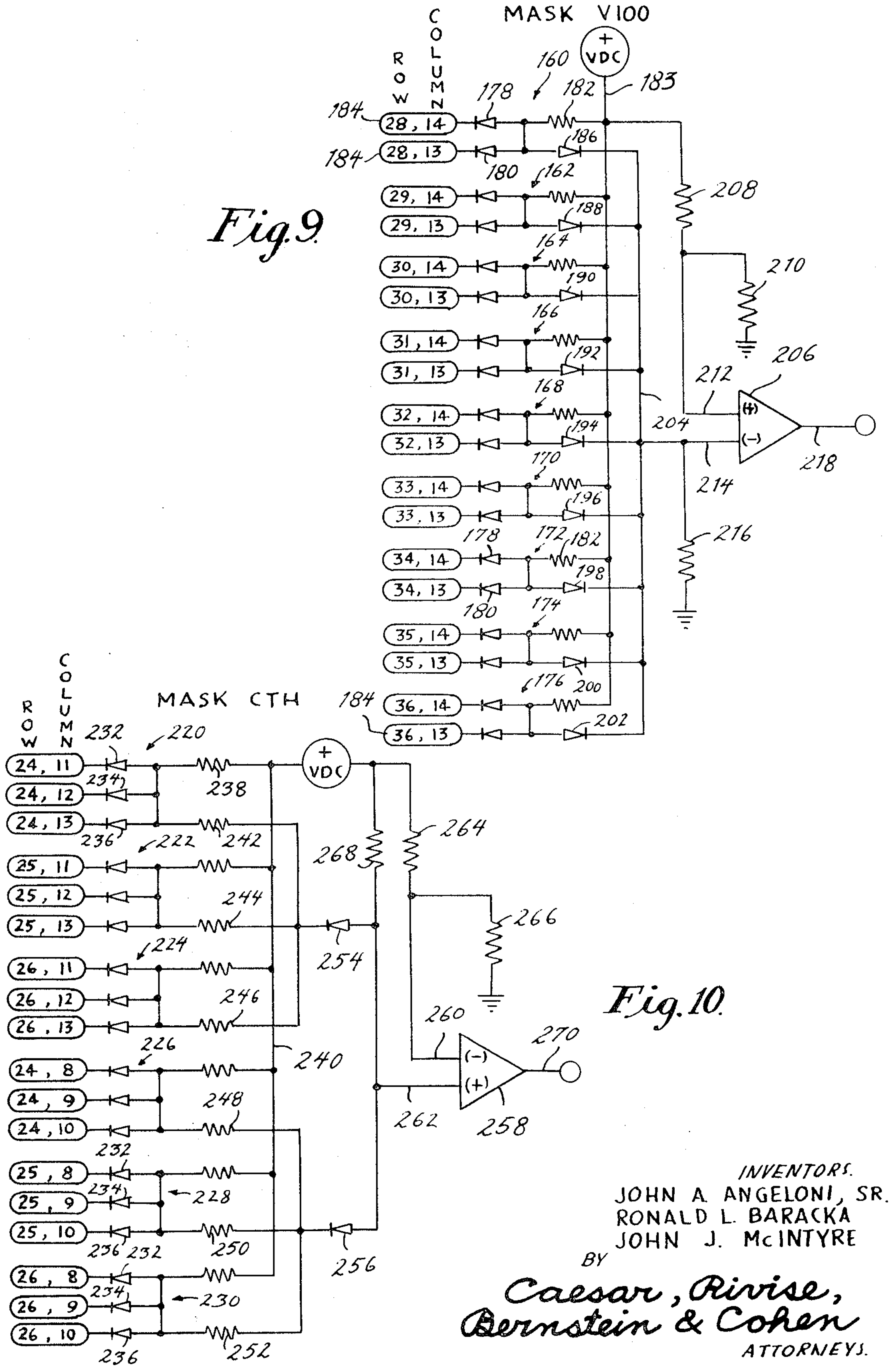
Figure 11:
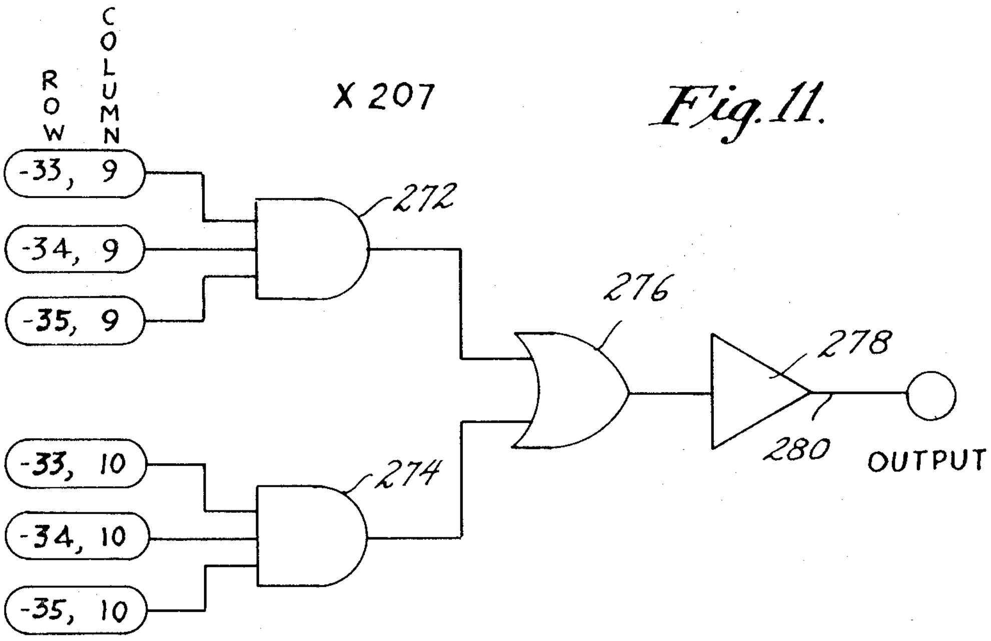
Figure 12:
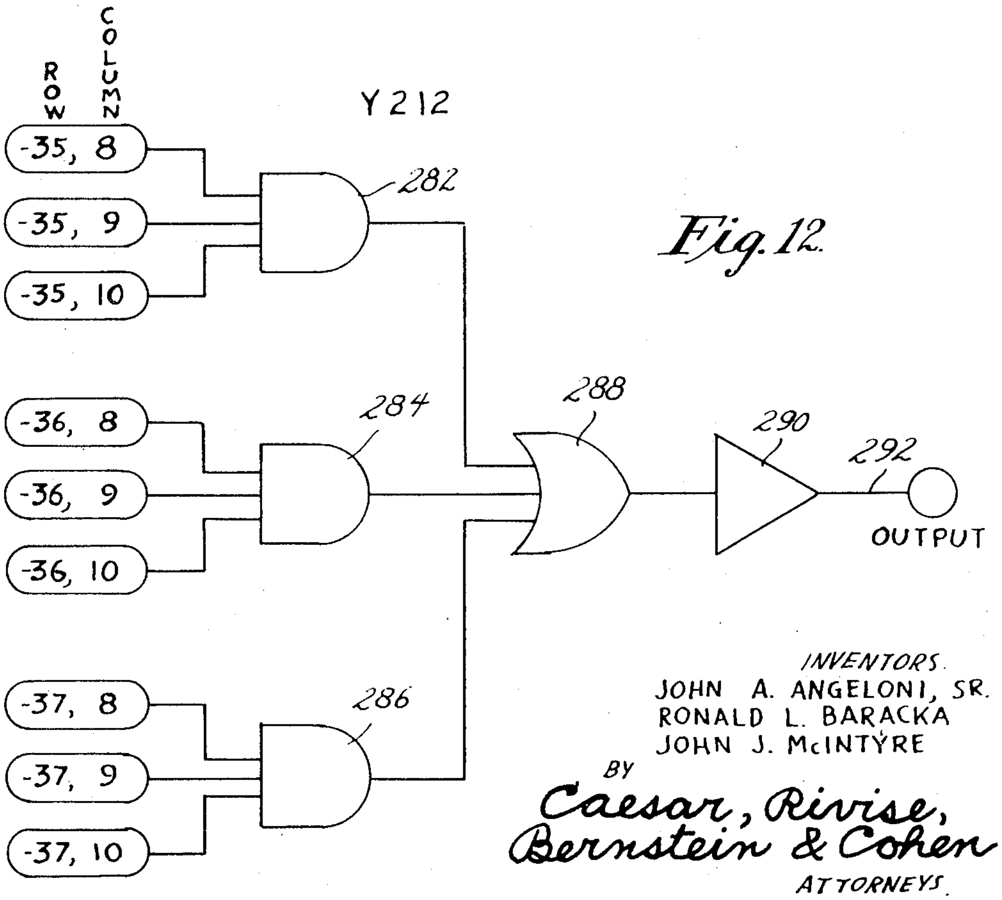
Figure 13:
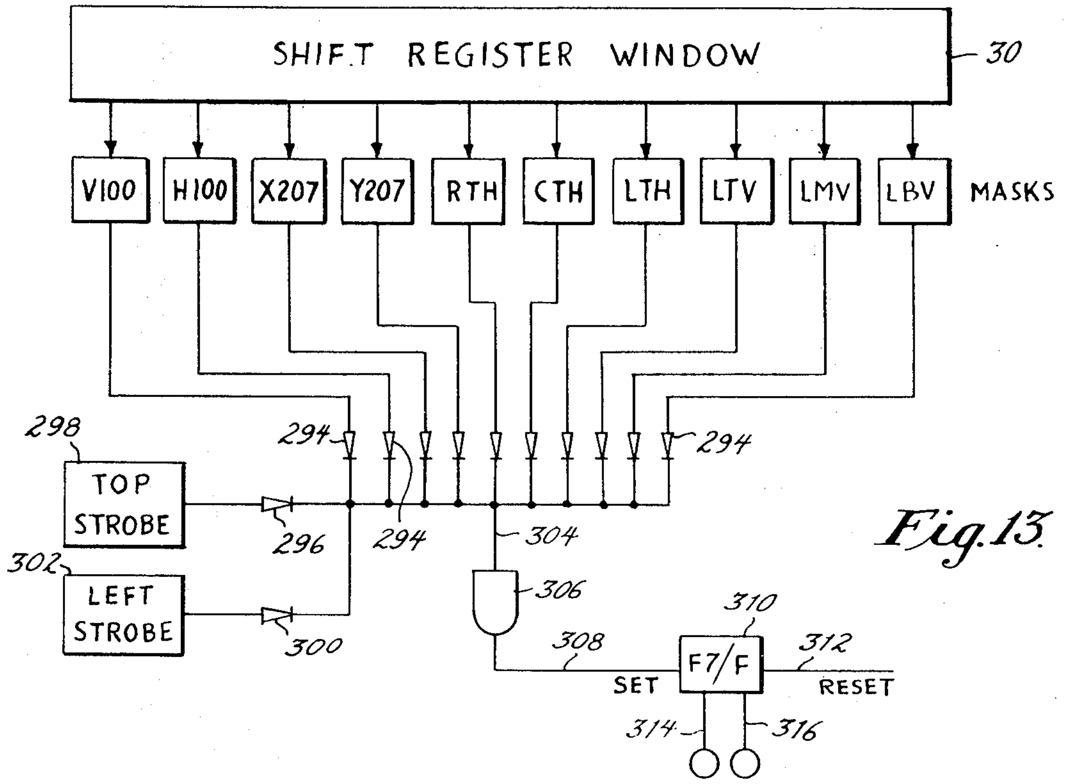
Figure 16:
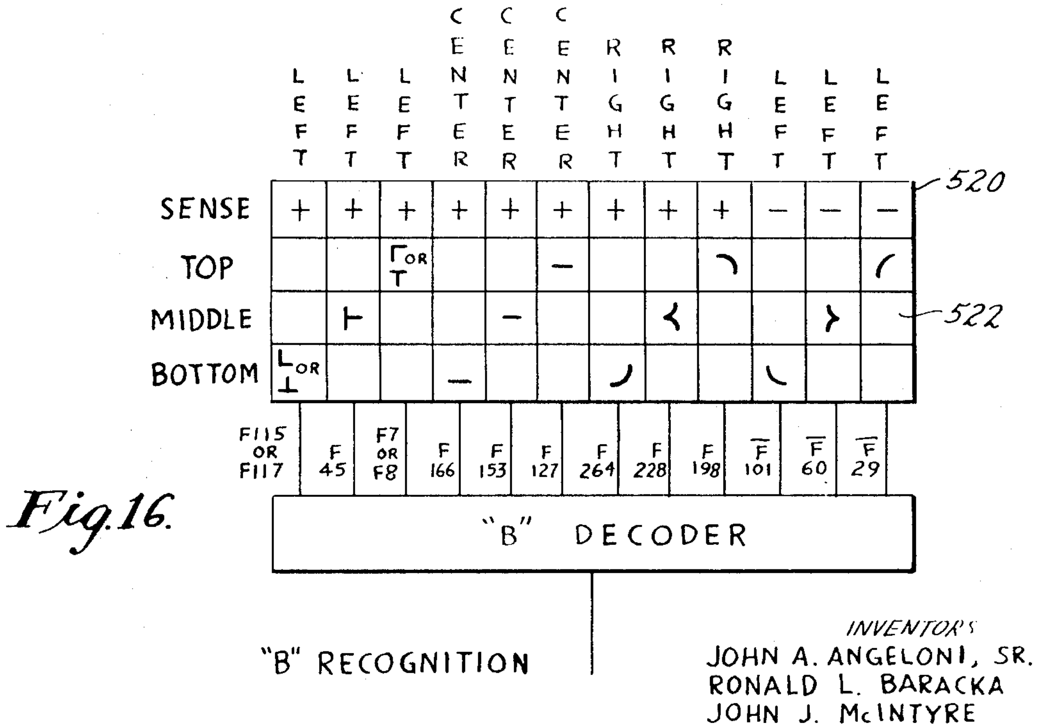
Figure 14:
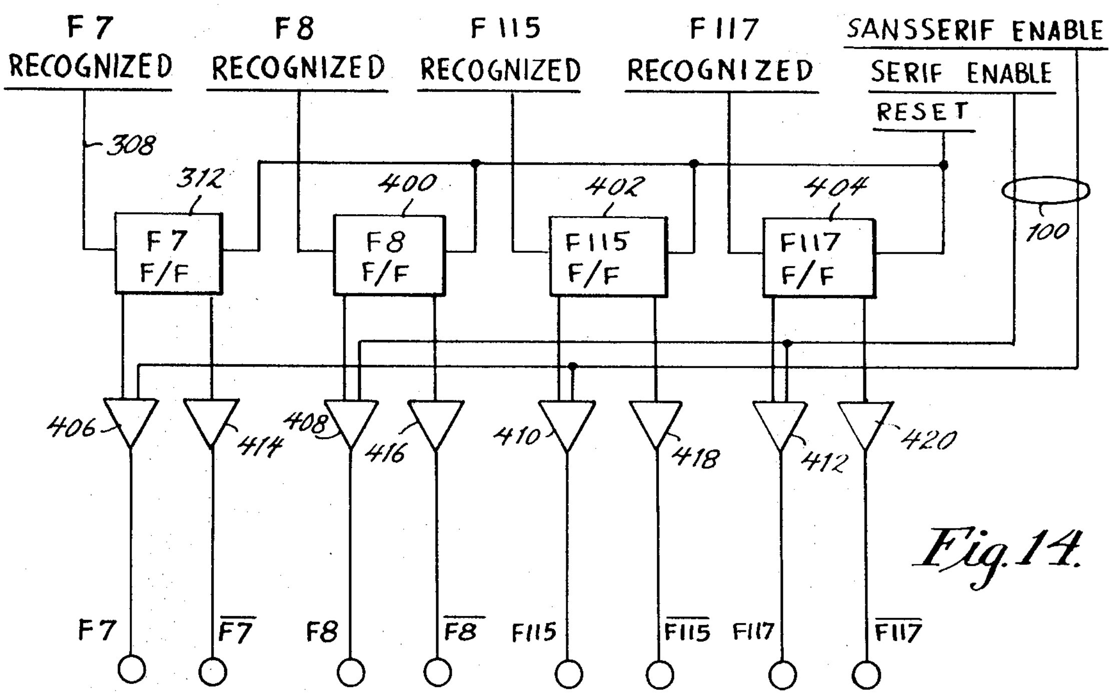
Figure 17:
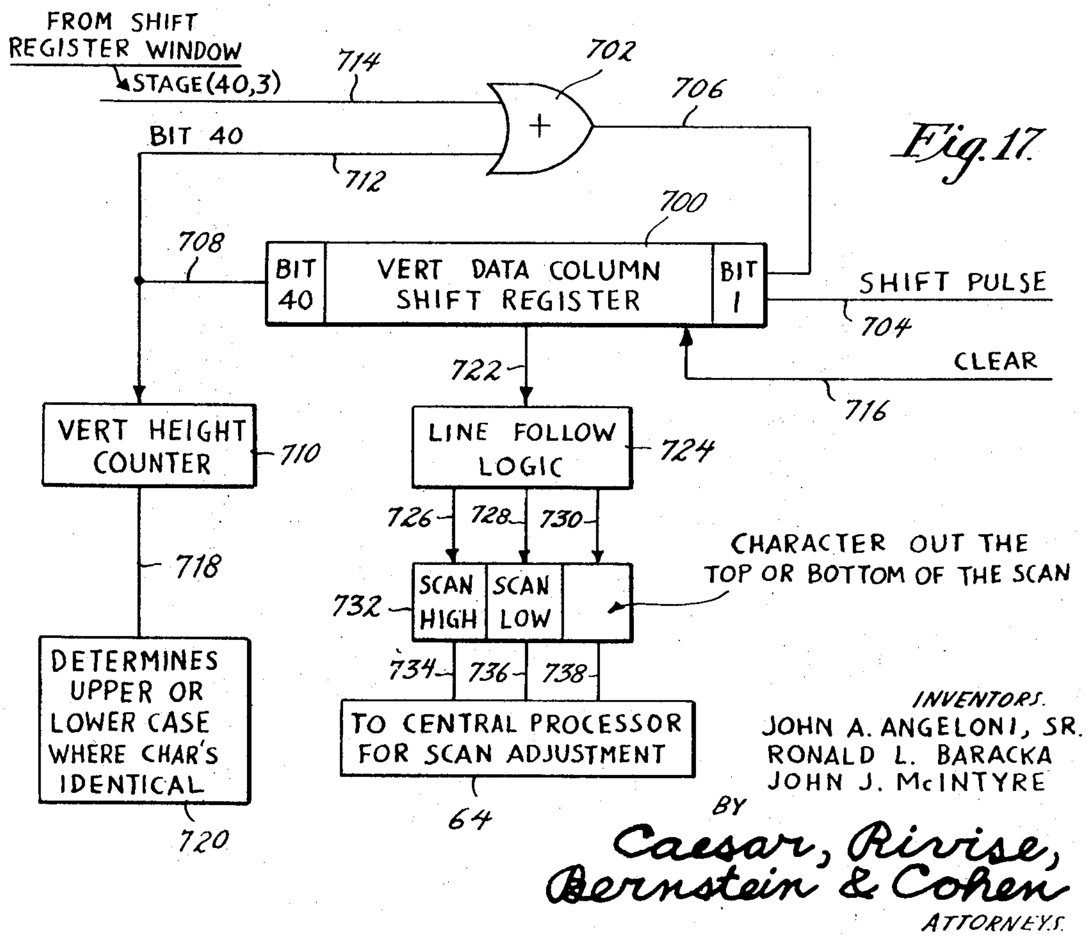
Figure 15:
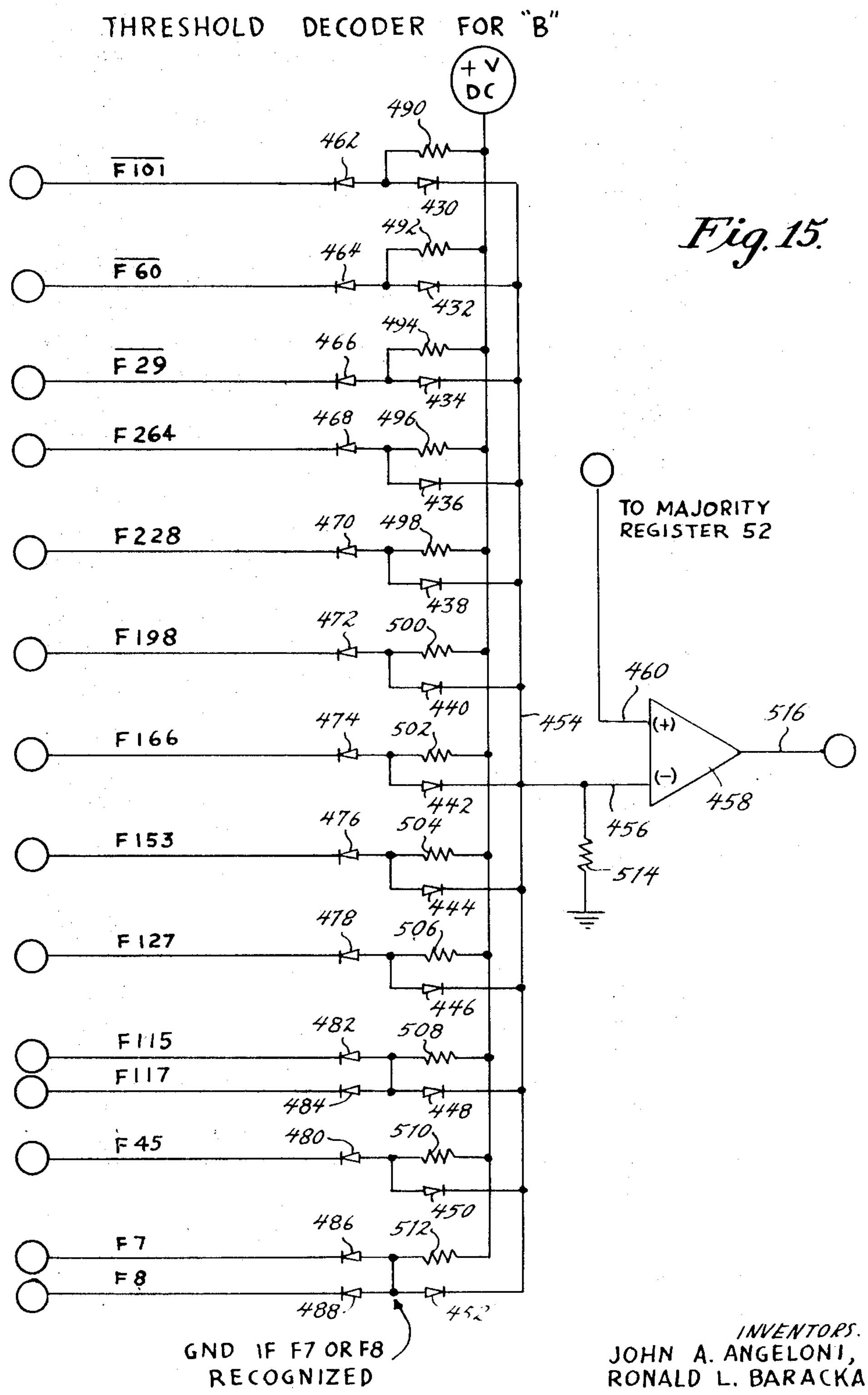
Figure 18:
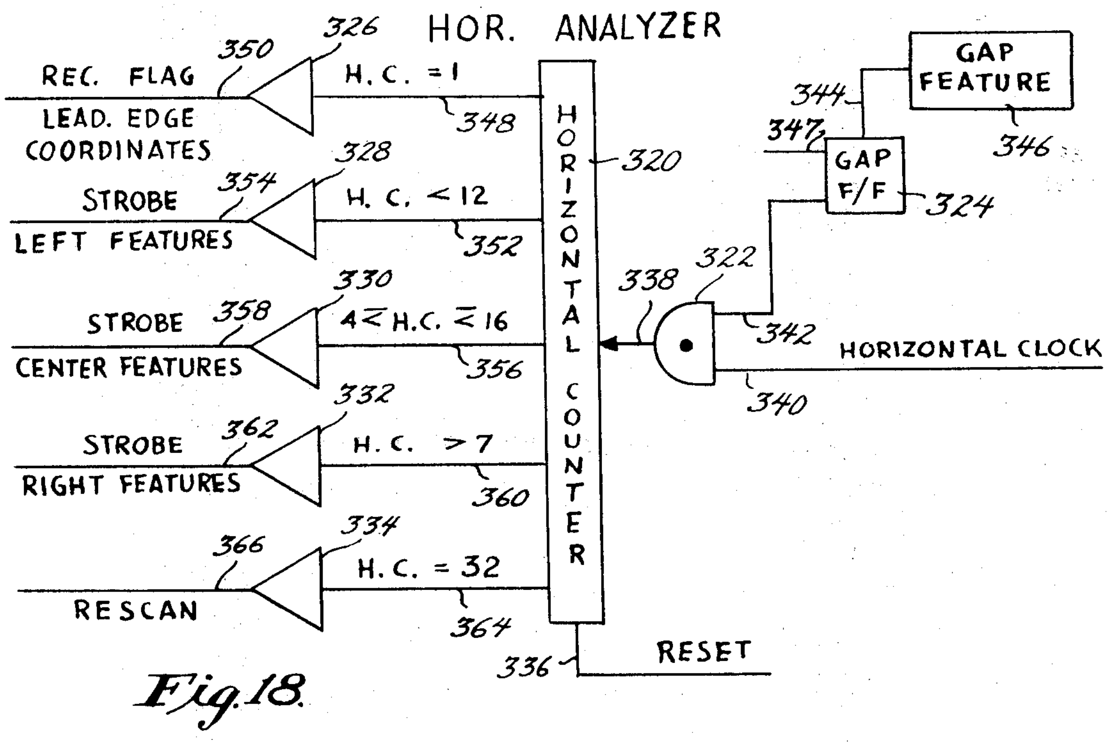
Figure 19:
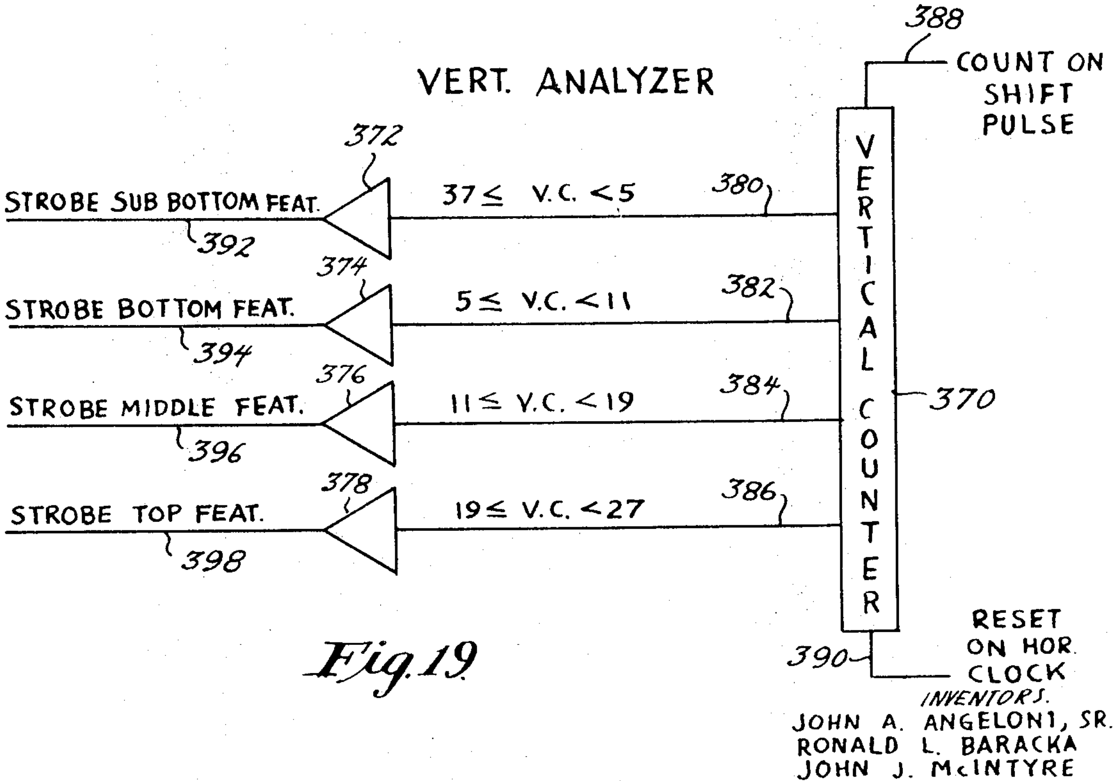

FIG. 6, comprised of FIGS. 6A through 6I, are diagrammatic representations of the subfeature mask which are required to detect the features in the upper case character "B";

FIG. 7, comprised of FIGS. 7A, 7B and 7C, are diagrammatic illustrations of the subfeature masks which are required for the left side features of the character "8";

FIG. 8, comprised of FIGS. 8A and 8B, are diagrammatic illustrations of the subfeature masks required for the top left corner and the bottom left corner features for a serifed upper case character "B";

FIG. 9 is a schematic diagram of a positive subfeature mask;

FIG. 10 is a schematic diagram of a negative subfeature mask;

FIG. 11 is a schematic block diagram of a six input negative mask gate;

FIG. 12 is a schematic block diagram of a nine input negative mask gate;

FIG. 13 is a schematic block diagram of a feature detector and the storage means associated therewith;

FIG. 14 is a schematic block diagram of a portion of the feature storage register;

FIG. 15 is a schematic diagram of a character threshold decoder;

FIG. 16 is a diagrammatic illustration of the threshold decoder for the upper case character "B";

FIG. 17 is a schematic block diagram showing the vertical data column and its associated circuitry;

FIG. 18 is a schematic block diagram of the horizontal analyzer;

FIG. 19 is a schematic block diagram of the vertical analyzer; and

Figure 20:
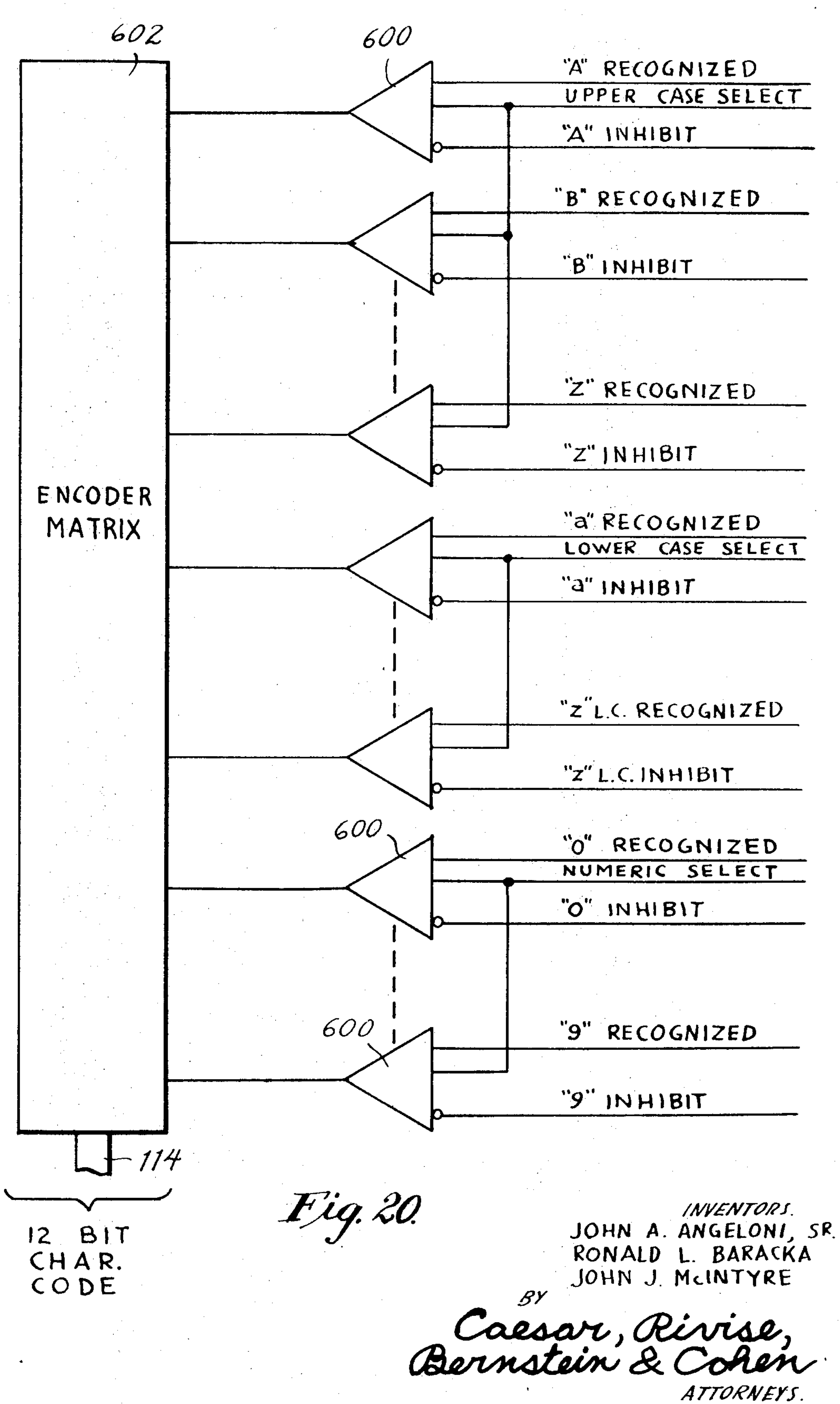

FIG. 20 is a schematic block diagram of the encoder.

Figure 1:
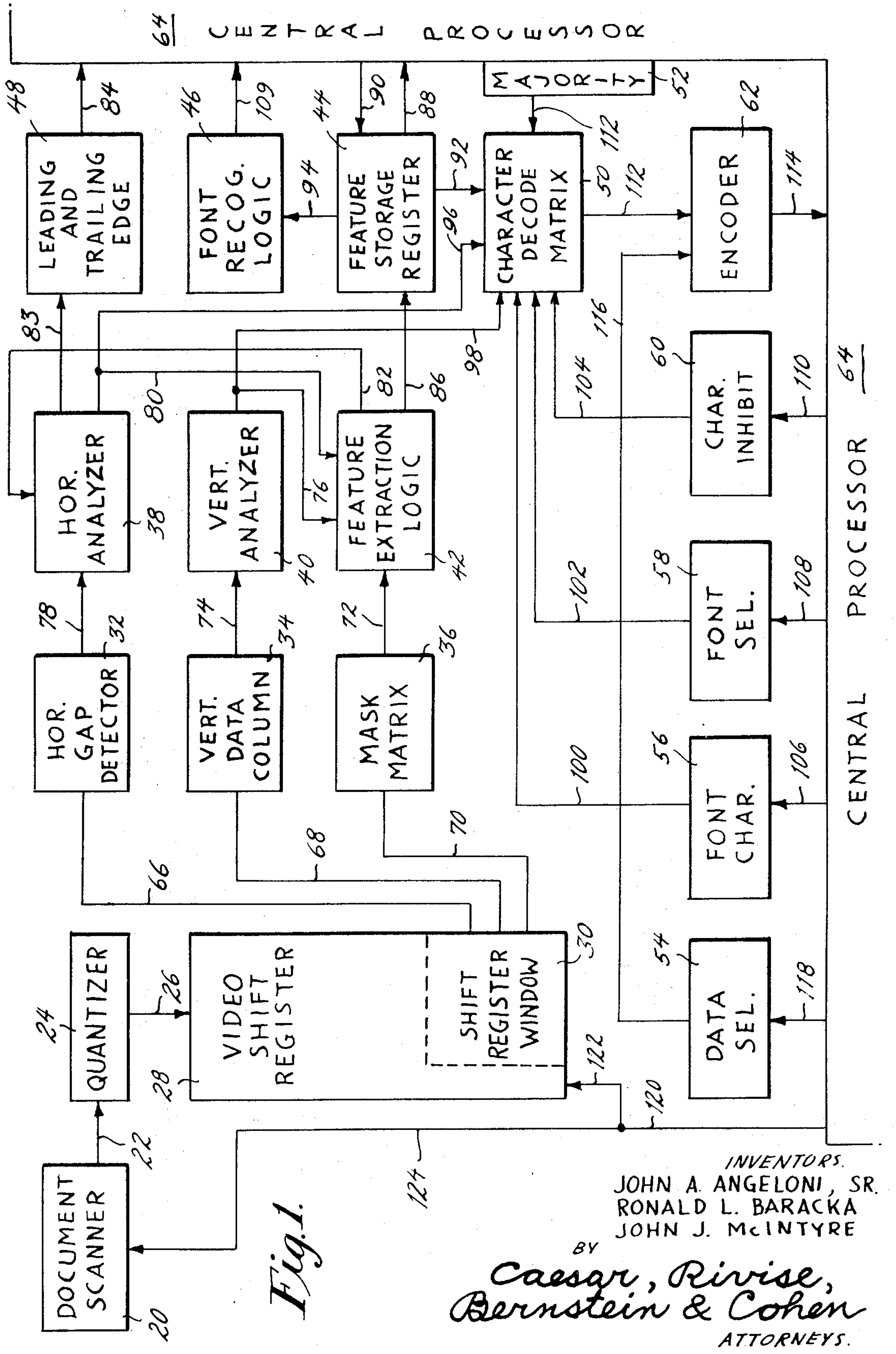
FIG. 1 is a schematic block diagram of a character recognition system embodying the invention.

Referring now in greater detail to the various figures of the drawings wherein similar reference characters refer to similar parts, a character recognition system embodying the invention is shown generally in FIG. 1. For purposes of clarity, the control circuitry associated with the various components of the system has been omitted.

The character recognition system basically comprises a document scanner 20 which includes means for handling the document and means for scanning the characters on a document. A preferred embodiment of the document handler is shown in application Ser. No. 734,777, filed June 5, 1968 entitled "Document Handler" and owned by the assignee hereof. The means for scanning the document in document scanner 20 preferably comprises a flying spot scanner for scanning individually each of the characters provided on a document.

The output of the document scanner which is generated by a photomultiplier therein is fed by lines 22 to a quantizer 24. The output signal from document scanner 20 is an analog signal which is quantized by the quantizer 24 to produce a binary quantization of the character pattern formed by scanning an area or field on a document.

The output signal of the quantizer 24 s provided on line 26 which is connected to a video shift register 28. As the output signal from the document scanner 20 is provided to the quantizer, the quantizer samples the signal and provides the binary quantized signals to the video shift register 28 serially. As seen in FIG. 1, a portion of the video shift register 28 is shown within dotted lines and labeled "Shift Register Window," As will hereinafter be seen in greater detail, the entire character is shifted through the shift register window 30 and the shift register window is therefore the only portion of the shift register 28 which is looked at by the feature extraction circuitry. In accordance with the features that pass through the shift register window, the entire character is recognized by the recognition circuitry.

The character recognition circuitry is connected to the shift register window 30 and includes a horizontal gap detector 32, a vertical data column 34, a mask matrix 36, a horizontal analyzer 38, a vertical analyzer 40 and feature extraction logic 42.

In addition, here is also provided a feature storage register 44, font recognition logic 46, leading and trailing edge detector 48, character decode matrix 50, majority register 52, data select register 54, font characteristic register 56, font select register 58, character inhibit register 60 and encoder 62. Finally, a central processor is provided which is interrelated with each of the components of the character recognition system including document scanner 20, the quantizer 22 and the video shift register 28 in order to provide the necessary control signals for the flow of data throughout the system.

The horizontal gap detector 32 is connected via lines 66 to the shift register window 30 to detect actual gaps between characters to determine when a character ends and the next character begins. The vertical data column 34 is connected via line 68 to one of the stages of the shift register 30 to determine the height of a character and also provide information to the vertical analyzer to enable the document to follow a skewed line on a document.

Mask matrix 36 comprises the subfeature masks and is connected via lines 70 to the stages of the shift register window to determine the contents of the shift register window in order to provide combinatorial determinations of the presence and absence of lines for use in determining the features present in the shift register window 30.

The mask matrix 36 is connected via lines 72 to the feature extraction logic 42 which comprises the feature detectors, which determine the combination of subfeature masks which have been enabled and which have not been enabled in order to detect which features have been located within the shift register window.

The vertical data column 34 is connected via line 74 to the vertical analyzer 40. The vertical analyzer 40 senses the vertical data column to determine whether or not a scanner has been following a line accurately. That is, where a line is skewed (i.e. not exactly horizontal) on a document, as the scan progresses along the line, the scan will wind up either being too high or too low as it progresses along the line. The vertical analyzer keeps track of the location of the character within the scan to ensure that the characters remain within the scan throughout the entire line. The vertical analyzer 40 also provides information via lines 76 to the feature extraction logic 42 which enables the feature extraction logic to determine the portion of the character that is passing through window 30.

The horizontal gap detector 32 is connected via line 78 to horizontal analyzer 38. Horizontal analyzer 38 is connected via lines 80 and 82 to the feature extraction logic 42. Information is provided on lines 80 from the horizontal analyzer to the feature extraction logic 42 which indicates the horizontal portion of the character which is in the shift register window. Information is also provided on the output lines 82 of the feature extraction logic to the horizontal analyzer to provide information as to right-handed features of a character that are detected so that if a true gap between two adjacent characters is not detected by the gap detector 32, the horizontal analyzer can still determine where one character ends and the next character begins from the features detected by the feature extraction logic.

The horizontal analyzer 38 is connected via line 83 to the leading and trailing edge detector 48 which receives information as to the coordinates of the leading and trailing edges of the character. The edge detector 48 is connected to the central processor 64 via lines 84. The coordinates detected by the leading and trailing edge detector 48 are fed via lines 84 to the central processor 64.

The feature extraction logic is connected to and provides the features detected via lines 86 to a feature storage register 44. The feature storage register 44 includes storage means for each of the possible features which can be detected in the characters of all the fonts that the character recognition system is programmed to read.

Feature storage registers are connected via input lines 88 and output lines 90 to the central processor 64.

The feature storage register is also connected to the character decode matrix via lines 92 to the font recognition logic lines.

The character decode matrix is connected to output lines 96 and 98 of the horizontal analyzer and vertical analyzer, respectively. Based on the information provided on lines 92, 96 and 98, the character decode matrix is capable of determining the character that has been scanned after the features of a character have been determined and stored in the feature storage register 44. The font characteristic register, the font select register 58 and the character inhibit register 60 are also connected to the character decode matrix via lines 100, 102 and 104, respectively. The font characteristic register is connected to and programmed by the central processor via line 106 to provide information via lines 100 as to the characteristics that are present in the font of type being read such as serifs or characters that are sansserif.

The font select register 58 is also connected to and programmed by the central processor 64 via lines 108. The register 58 is set so that information is provided via lines 102 to provide the character decode matrix with the information as to the particular font of characters that is being used. For example, the type used in one model of typewriters has varying features in its characters with respect to the type used in another model of typewriter. The combination of features that are required for each character are thus set up in the character decode matrix. The font recognition logic 46 is connected to central processor 64 via lines 109. The font recognition logic 46 is responsive to the feature storage register 44 to determine from the features detected, the particular font of type which is used on a document. This font information is provided via lines 109 to the central processor which automatically programs registers 56 and 58.

The character inhibit register is also connected to and programmed by the central processor 64 via lines 110 and as will hereinafter be seen, the character inhibit register is provided to inhibit a character when more than one character has been recognized by the character decode matrix 50. The character decode matrix is also connected to and fed information from majority register 52 via lines 112. The majority register 52 provides signals on line 112 which indicate the number of features which can be missing in the detection of a character and yet still positively identify the character. The majority register 52 is also programmed by the central processor.

The output of the character decode matrix is fed via lines 112 to encoder 62. The encoder 62 converts the signal on one line to a multibit binary code. In the preferred embodiment, a 12 bit binary code is provided on the output lines 114 of the encoder which are connected to the central processor for the recordation and processing of the character recognized. The encoder 62 is also connected to and receives input signals via line 116 from the data select register 54. The data select register 54 is connected to and programmed by the central processor 64 via lines 118.

The data select register provides information via lines 116 to the encoder which prevents the encoder from encoding any data which is not being examined. That is, where only upper case characters are desired, only the upper case characters that are recognized are encoded by the encoder 62 and provided to the central processor 64.

Similarly, where other data is required such as editing symbols, the encoder is enabled by the information provided on lines 116 to encode the signals and provide the code to the central processor 64. The central processor 64 is also connected to the video shift register 28 via lines 120 and 122. The central processor provides via lines 120 and 122 signals to shift the contents of the shift register as the information from the document scanner is received.

The central processor is also connected via lines 120 and 124 to the document scanner 20 and specifically the flying spot scanner therein to provide signals for either reducing or enlarging the scan or moving the scan up, down or sideways in order to completely encapsulate a character within the scan and to normalize the character within the scan.

Figures 2, 5:
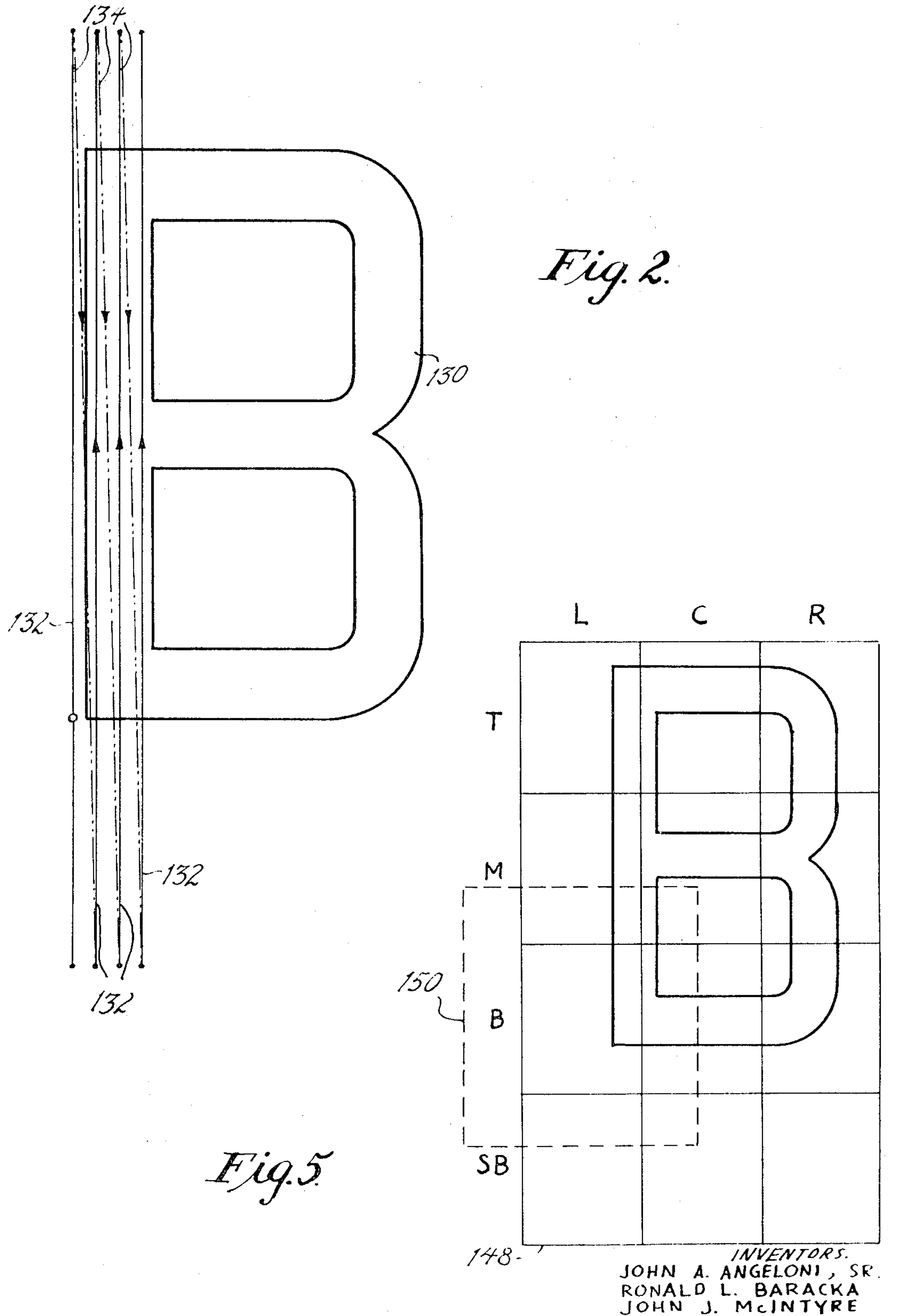
FIG. 2 is a diagrammatic illustration of a scanning pattern sampling a character on a document.
FIG. 5 is a diagrammatic representation of a sampled field on a document which illustrates the independent recognition of features in the character as they pass through the shift register window.

The scanning of a character is diagrammatically illustrated in FIG. 2. FIG. 2 shows an upper case character "B" on a document as it is being scanned by a flying spot scanner. The path that the flying spot scanner traverses on the document is represented by the solid lines 132 which include upwardly extending arrowheads to indicate the direction of movement of the flying spot scanner along the document.

The lines 134 which are shown in phantom indicate the return path of the flying spot scanner after each scan line 132 has been completed. The quantizer 24 effectively samples the signal from the document scanner 40 times for each line 132 that is traversed along the document. That is, the output of the photomultiplier is quantized 40 times as the beam from the flying spot scanner makes one vertical stroke. The length of the strokes of the flying spot scanner are so normalized that the entire length of an upper case character 130 is the length of approximately 25 samples along the vertical stroke.

The character is also so located within the scan raster of the flying spot scanner that approximately 10 samples along the vertical scan lines are taken below the character and five samples taken above the top of the character. It should be noted that lines 132 of the scan raster progress from a point which is to the left of and below the character to be scanned and wind up at a point which is to the right of and above the end of the character. The character recognition equipment includes feature detectors for the portions of characters which are disposed below the normal bottom edge of a line of characters such as the lower portions of lower case characters *g*, *p*, and *y*. The feature extraction logic determines that the subbottom features are present and does not lower the scan raster with respect to the characters provided in a line. Thus, the bottommost edge of such a character would not be spaced within the raster so that the lowermost edge is 10 samples above the bottommost portion of the scan raster.

It should also be noted that the sequence of the quantized samples provided from the quantizer to the shift register should be in the order of samples taken along lines 132 in FIG. 2. However, the scan raster need not follow lines 132. A preferred scanning pattern is illustrated in application Ser. No. 675,236, filed Oct. 13, 1967 entitled "Retrogressive Scanning Pattern" and owned by the assignee hereof.

Figures 3, 4:
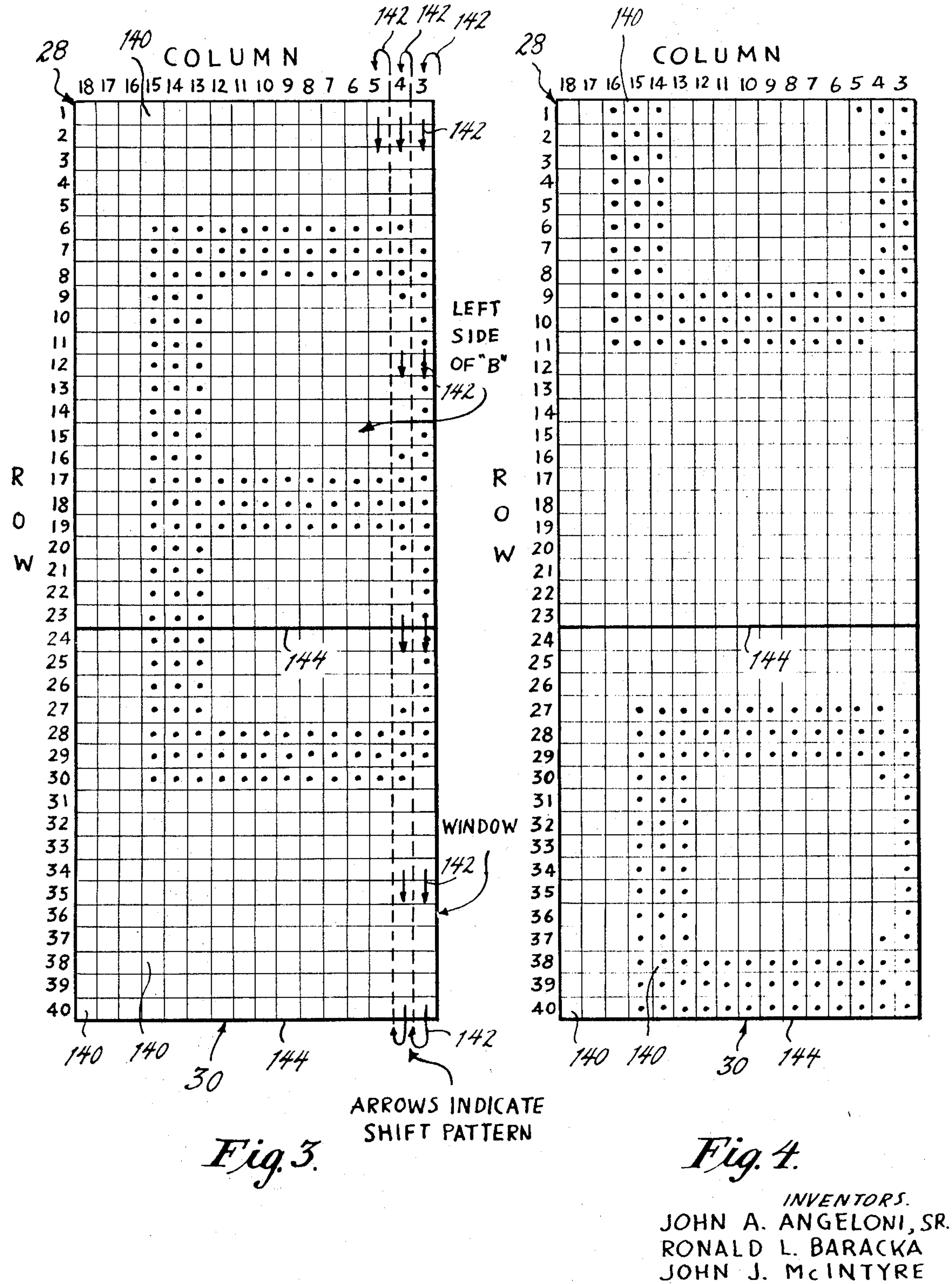
FIG. 3 is a diagrammatic illustration of a quantized character pattern being shifted through the video shift register.
FIG. 4 is a diagrammatic illustration of a quantized character pattern in a position in the video shift register so that the top left feature of the character can be detected.

The operation of the video shift register 28 is diagrammatically illustrated in FIG. 3. Video shift register 28 includes 720 stages which are serially connected together. The stages of the shift register can be considered to be provided in the form of 18 columns having 40 stages per column. Each of the stages of the shift register can also be considered to correspond to a location on the document through which the scan raster is progressing. Thus, as the scan raster progresses along a line in the field of a document, the binary quantized signals are provided on line 26 to the first stage of the shift register 28. The shift register is so connected that the first 40 stages of the shift register are provided in the first column. The bottommost or 40th bit in the first column is connected to the first bit of the second column. The 40th bit of the second column is connected to the first bit of the third column and so on through the 17th column, the 40th bit of which is connected to the first bit of the 18th column. As seen in FIGS. 3 and 4, the video shift register is diagrammatically illustrated as a rectangle having a plurality of boxes 140 each of which represents a single stage of the shift register 28. The video shift register stages are each comprised of a flip-flop having output lines representative of the state of the shift register stage.

In both FIGS. 3 and 4, the columns 3 through 18 and rows 1 through 40 of the shift register are diagrammatically illustrated by the boxes 140, each of which represents one of the stages of the shift register. The quantized binary signal is shifted into the third through 18th columns of the shift register in the directions of arrows 142. It can therefore be seen that the information travels down column 3 from row 1 to row 40, progresses up to row 1 of column 4 and down column 4 until it reaches the 40th row. The information is then shifted into the first row of column 5 and so on until the information in the register is shifted out the 40th row of the 18th column.

The boxes 140 which are shown as blank in FIG. 3, represent shift register stages that have a quantized binary signal representative of a white area of the document being scanned. The boxes which have a dot in the center thereof represent a shift register stage which has the quantized binary signal indicative of a black area being scanned. Thus, the blank boxes 140 can be considered to represent a "0" in the shift register stage and the boxes with a dot therein represent a "1" in the shift register stage.

The shift register window 30 includes 272 stages of the video shift register 28. The specific stages of the video shift register 28 which are included in the window 30 are those stages of the shift register as represented by boxes 140 which are provided within the boundary of the thick solid line 144. The line 144 provides a periphery about the stages of the video shift register 28 which are in columns 3 through 18 and are within rows 24 through 40 of the shift register 20. Thus, the window is 16 stages wide by 17 stages high.

In FIG. 3, the shift register is illustrated with the binary quantization of the left side of a "B" shown as it is stored in the video shift register 28 during one time interval as it passes through the shift register 28. The outline of the upper case character "B" takes shape in the form of the stages that are in the "1" state indicating that a quantized signal representative of black portion on the document has been scanned. The stages in the shift register thereby correspond to a specific portion of the field of the document that has been scanned when the number of times that the character pattern has been shifted into the register is divisible by 40. That is, as seen in FIG. 3, the shift register corresponds to the area in the field that has been scanned since the bottom edge of character "B" is in row 30, which is 10 samples or rows above the bottom of the scan raster.

The left side of the character "B" is illustrated within the shift register 28 in FIG. 3 as the lower left-hand corner of the character "B" is being shifted into the window 30 of the shift register 28. Referring now to FIG. 4, the shift register 28 is diagrammatically shown after 21 shifts of the binary quantized pattern in the shift register after the position shown in FIG. 3. Thus, as can be seen, the bottom portion of the character "B" is now progressing through the top of the shift register 28. Simultaneously, the left hand top portion of the character is in a position within the window 30 for recognition of the top left feature of the character. Thus, as the character progresses through the shift register, all of the features in the character are at some time within the shift register window 30.

The scan of a field of a character is graphically illustrated in FIG. 5. FIG. 5 depicts a field on a document which has been divided into 12 zones. The zones are in three columns which are depicted as left center and right and are labeled as "L," "C" and "R," respectively. The zones are also segmented into four rows which are respectively, the top, middle, bottom and subbottom rows which are labeled as "T," "M," "B" and "SB," respectively. In order to be consistent with the earlier drawings, the upper case character "B" is illustrated on the field in the relationship in which it would be scanned within a field. A dotted line 150 which is in the form of a rectangle corresponds to the window 30 of the shift register. It can be seen that the window 30 which is represented by the dotted line 150 is actually larger than each of the zones of the field. In addition, the window, as represented by the dotted line 150 can be considered to move about the field 148 in the same direction as the beam of the flying spot scanner progresses along lines 132 in FIG. 2. In reality, as shown in FIGS. 3 and 4, the binary quantized character pattern is shifted through the shift register 28 and causes the feature in the quantized character pattern to be shifted through the window.

Features within the character such as the lower left-hand corner, the upper left-hand corner, the middle of the left-hand side are each detected individually and independently of each other. That is, since the entire character is not examined simultaneously, the individual features in the character are recognized independently of each other. This sequential detection of the features within the character enables greater power of recognition because the features detected in a character are not dependent on each other.

For example, if one upper case character "B" has a much larger bottom loop than top loop and a second upper case character "B" has an equal sized upper loop and lower loop, a system that requires the simultaneous detection of features would not be able to recognize both of these character "B" as the character "B" since the relationship in space between the top left-hand corner of the "B," the lower left-hand corner of the "B" and the center left side of the "B" would be differently spaced in relationship to each other. It can also be seen that the only difference between the upper case character "B" and the character numeral "8" are in the left side features of the characters. Where there is simultaneous examination of each of the features, the exact spacing between the top left hand corner, the bottom left-hand corner and the middle left side of these characters become critical. However, where there is not dependence on the distance between each of these features, each of the features can be detected independently of each other thereby enabling relative size and thickness of line or spacing between the features to be irrelevant in the detection thereof.

Another reason for the greater power of detection when each of the features is individually examined is the fact that a greater exactness in the feature can be required. Where simultaneous detection of features is required, there must be greater latitude in the feature masks thereby preventing the distinguishment of a curved character feature from a corner feature for example.

By the provision of a window which is larger than each of the individual zones of a field, the feature can be looked for in great detail yet vary in size with respect to the other features of the character. This is extremely important in proportional spaced typing wherein many letters take on different widths because of the squeezing and enlarging of the characters to fit within predetermined lengths of lines. Thus, even a book or publication such as a newspaper can be utilized in the character recognition system disclosed herein since there is not requirement of simultaneous detection of features. Thus, the spacing of the V-shaped features in a wide "W" or a narrow "W" in a proportional type system would cause no difficulty in the detection and recognition of the fact that a character "W" has been scanned.

Each feature in a character is detected by examining the combination of various white areas and black areas on the document simultaneously. These white and black areas on a document are detected by the mask matrix 36 which is connected to shift register window 30. Each feature is detected by requiring the simultaneous detection by a predetermined combination of the subfeature masks, the pattern desired.

FIGS. 6A through 6I, FIGS. 7A through 7C and FIGS. 8A and 8B are diagrammatic illustrations of the subfeature masks that are connected to each of the feature detectors that are to be examined in the recognition of an upper case character "B."

Figures 6A, 6D:
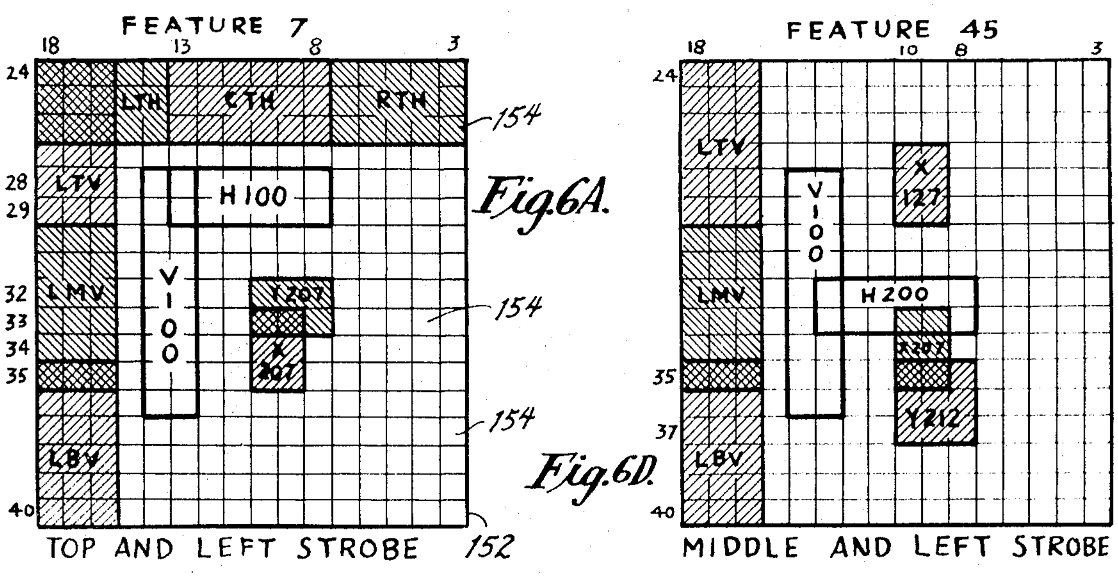

FIG. 6A is a diagrammatic representation of the subfeature masks which are necessary to detect the feature in the top left-hand corner of the upper case character "B." The top left-hand side feature of the upper case character "B" will hereinafter be referred to as feature 7.

FIGS. 6B, 6C, 6D, 6E, 6F, 6G, 6H and 6I are the diagrammatic illustrations of the subfeature masks which are necessary to detect the features in the top center, top right, middle left, middle center, middle right, bottom left, bottom center and bottom right of the upper case character "B," respectively. These features will hereinafter be referred to as feature 127, feature 198, feature 45, feature 153, feature 228, feature 115, feature 166 and feature 264, respectively, in FIGS. 6B through 6I.

FIGS. 7A, 7B and 7C are diagrammatic illustrations of the subfeature masks which are necessary to detect features on the left-hand side of the character "8." These features are respectively referred to hereinafter as feature 29, feature 60 and feature 101 in FIGS. 7A, 7B and 7C.

FIGS. 8A and 8B are diagrammatic illustrations of the subfeature masks which are necessary to detect the top left-hand corner and the bottom left-hand corner, hereinafter referred to as feature 45 and feature 153, respectively, in a serifed upper case character "B."

Each of the diagrammatic illustrations in FIGS. 6A through 6G, 7A, 7B, 7C, 8A and 8B is best understood in connection with the following explanation of FIG. 6A.

FIG. 6A depicts the stages in the shift register window 30 as shown in FIGS. 3 and 4 with the subfeature masks superimposed over the stages of the shift register that the masks are connected to. The mask matrix 152 in FIG. 6A thus comprises 16 columns by 17 rows of boxes 154. The columns are labeled 3 through 18, respectively, and the rows are labeled 24 through 40, respectively, to correspond with the stages of the shift register which form the shift register 30 which are in columns 3 through 18 and rows 24 through 40. Thus, a box at the intersection of column 3 and row 24 in the feature 7 mask matrix corresponds to the stage of the shift register in column 3 row 24 as depicted in FIG. 3 or FIG. 4.

It can therefore be seen that the detection of feature 7 requires the satisfaction of subfeature masks LTH, CTH and RTH; LTV, LMV and LBV; H100, V100 and Y207 and X207. The shaded masks (i.e. those masks shown with crosshatchings therein) represent negative masks which are provided to detect a white area on the document. The masks which are blank (i.e.those having no crosshatchings) represent positive masks (i.e. those masks which detect black areas on a document). Where the negative masks overlap, as is the case with LTH and LTV, the common areas include crosshatchings in opposite directions. The parts of the masks which are not common include crosshatches in only one direction. Where the positive masks overlap (FIGS. 6F and 7B), the designation of each is provided in the common areas.

The subfeature masks in FIG. 6A include within the boundary thereof each of the boxes 154 which correspond to the stages that the masks themselves are connected to. For example, in positive mask V100, 18 boxes are encompassed which correspond to the stages of the shift register in columns 13 and 14 between rows 28 to 36 inclusive. For purposes of clarity, a stage will be identified in accordance with its row and column. For example, the stage which is in column 18 and row 24 will be hereinafter referred to as 24,18. Similarly, any reference to a line connected thereto in the figures is shown with a similar legend. That is, the line connected to stage 24,18 includes the legend 24,18 which is encircled.

Mask V100 is an exemplary positive feature mask which is provided to detect a vertical line in a feature and is illustrated schematically in FIG. 9. Mask V100 basically comprises nine OR gates 160 through 176, each of which comprises a pair of diodes 178 and 180 which are connected together at one end to a resistor 182.

Each of the resistors 182 is connected at its other end to a buss line 182 which is connected to a source of positive voltage (+v. DC). Each of the diodes of each of the OR gates is connected at its other end to one row in columns 13 and 14. That is, diodes 178 and 180 of OR gate 160 are connected to stages 28,14 and 28,13, respectively, of the shift register window. It should be remembered that the encircled stages 184, each of which includes a pair of numbers, refers to the stage in the shift register window by the row and column designation therein that the line is connected to. Therefore, diodes 178 and 180 are connected to stages 28,14 and 28,13, respectively.

Similarly, diodes 178 and 180 of OR gate 162 are connected to stages 29,14 and 29,13, respectively. The diodes 178 and 180 of OR gate 164 are connected to stages 30,14 and 30,13, respectively. The diodes of OR gate 166 are connected to stages 31,14 and 31,13, respectively. The diodes of OR gate 168 are connected to stages 32,14 and 32,13, respectively. The diodes of OR gate 170 are connected to stages 33,14 and 33,13. The diodes of OR gate 172 are connected to stages 34,14 and 34,13. The diodes of OR gate 174 are connected to stages 35,14 and 35,13. The diodes of OR gate 176 are connected to stages 36,14 and 36,13.

Mask V100 further includes nine diodes 186 to 202 which are each connected at a first side to a buss line 204. The other sides of diodes 186 through 202 are connected to the outputs of OR gates 160 through 176, respectively. The diodes are connected to the common point between the diodes of the OR gates and the resistors of the OR gates. Buss line 183 which is connected to the positive source of voltage is also connected to an analog voltage comparator via resistor 208 and to ground via resistor 208 and resistor 210. The first input line 212 to the analog voltage comparator is connected between the resistors 208 and 210 which thereby form a voltage divider between the positive source of voltage and ground. A second input 124 of the analog voltage comparator 206 is connected to the buss line 204. The buss line 204 is also connected via resistor 216 to ground. The diodes 186 through 202 in combination with comparator 206 act to form a majority gate which is enabled if eight of the nine OR gates are enabled.

The output signals from stages 184 of the shift register window are at ground if the stage of the register is in the "1" state or indicative of a black area on the field. If the state of the stage is "0" or a white field is detected, a signal of positive polarity is provided by the stage of the register.

As long as one input to the diodes of the OR gates 160 through 176 is at ground, the output of the OR gate is also at ground. Thus, if all nine OR gates are enabled (i.e. at least one of the inputs to each of the OR gates is at ground), the voltage at input line 214, the negative input line of the comparator 206, is less positive than the voltage to line 212, the positive input of the comparator 206. When the voltage at line 214 is less positive than at line 212, the condition causes the comparator to indicate a correlation in the mask V100 thereby producing a positive output voltage on the output line 218 of the comparator 206. As long as the output line is positive, it indicates that there is a positive correlation indicating that the mask conditions have been satisfied.

The comparator 206 is also enabled as long as no more than one of the OR gates 160 through 176 is not enabled. That is, if one of the OR gates is not enabled, it can be seen that the diode 186 through 202 which is associated with the OR gate becomes conductive thereby causing a positive voltage at line 214. The resistors 182 and 216 are so chosen that the voltage at line 214 is less positive than the voltage at line 212. However, if more than one OR gate is not enabled, there is conduction via two of the resistors 182 thereby causing the voltage at line 214 to increase thereby exceeding the voltage on line 212 and thereby causing the comparator to produce an output signal which is at ground.

Referring back to FIG. 6A, it can therefore be seen that mask V100 correlates with the pattern provided in the window of the video shift register as long as eight out of nine rows in adjoining columns of the shift register have a "1" in at least one of the columns. This correlation is specifically provided so that a line which is not exactly vertical still is recognized as a feature so long as one side or the other of the column is detected in eight of the nine rows of the two columns.

It should be noted that positive masks similar to V100 are provided with as many, more than or less than the number of OR gates shown in FIG. 9. As long as each of the OR gates is similar in resistance to resistors 182, the comparator 206 is enabled so long as all of the OR gates or all of the OR gates except one are enabled.

Thus, for example, the positive mask H100 is essentially identical to mask V100 except that only six OR gates are provided and only six diodes are provided in combination with the comparator 206. Each of the OR gates is connected to the two stages in a different one of the columns that mask H100 is associated with. That is, the first OR gate is connected to the stages 28,13 and 29,13 of the shift register window 30. Similarly, the second OR gate is connected to stages 28,12 and 29,12; the third OR gate is connected to stages 28,11 and 29,11; the fourth OR gate is connected to stages 28,10 and 29,10; the fifth OR gate is connected to stages 28,9 and 29,9; and, the sixth OR gate is connected to stages 28,8 and 29,8. If five out of the six OR gates are enabled, the comparator of mask H100 provides a positive signal on its output line 218. Similar considerations are utilized in each of the remaining positive masks.

In the case of curved positive masks that detect curved subfeatures such as mask C102 (FIG. 6C), the stages are connected in pairs to the OR gates along the path of the line. Thus, as long as one of the stages are in the black or "1" state substantially along the length of a curved line, there is sufficient correlation to the subfeature mask.

A positive feature mask may also include OR gates with more than two input diodes. For example, feature 228 in FIG.

6F requires a subfeature mask C104. Subfeature mask C104 includes two input OR gates which are responsive to each of the following pairs of stages: 31,14 and 32,14; 31,13 and 32,13; 31,12 and 32,12; 32,11 and 33,12; 32,10 and 33,11; 33,10 and 34,11; 33,9 and 34,10; 34,9 and 35,10; 34,8 and 35,9; 36,8 and 36,7; and, 37,8 and 37,7. Mask C104 also includes three input OR gates which include three diodes which are connected to the following groups of stages: 38,9 and 38,8 and 38,7; 39,9 and 39,8 and 39,7; and, 40,9 and 40,8 and 40,7. If any one of the three stages in the group are in the "1" state, the OR gate is enabled. The larger grouping of stages enables greater latitude in the correlation of the curved subfeature. That is, the direction or curvature of the lower portion of subfeature 104 can vary slightly without affecting correlation.

Thus, mask C104 includes 14 OR gates. Whenever 13 or 14 of the 14 OR gates are enabled, the mask generates a positive signal indicating the detection or correlation of the subfeature.

A negative mask is exemplified by mask CTH which is shown in FIG. 10. Referring back to FIG. 6A, it will be remembered that mask CTH detects a horizontal bar or line of white on a document in the center top of the window 30. Mask CTH basically comprises six AND gates 220, 222, 224, 226, 228 and 230, each of which comprises three diodes 232, 234 and 236 and a resistor 238. One side of each of the diodes is connected to resistor 238 and the opposite side is connected to the stages in one row of each of three columns. That is, the AND gate 220 is connected to stages 24,11; 24,12; and, 24,13 of the window. AND gate 222 is connected to stages 25;11; 25,12; and 25,13. AND gate 224 is connected to stages 26,11; 26,12; and 26,13. AND gate 226 is connected to stages 24,8; 24,9; and, 24,10. AND gate 228 is connected to stages 25,8; 25,9; and, 25,10. AND gate 230 is connected to stages 26,8; 26,9; and, 26,10. Each of the resistors 238 and the AND gates 220 through 230 are connected to a buss line 240 which is connected to a positive source of voltage (+v. DC).

Mask CTH further includes six resistors 242, 244, 246, 248, 250 and 252. Resistors 242 through 252 are connected at one end to the output of AND gates 220 through 230, respectively. Resistors 242, 244 and 246 are connected at their other end to one side of a diode 254 and the other ends of resistor 248, 250 and 254 are connected to one side of diode 256.

An analog voltage comparator 258 is provided which has a negative input line 260 and a positive input line 262. The positive source of voltage is connected to ground via a voltage divider comprised of resistors 264 and 266. The positive source of voltage is also connected via resistor 264 to the negative input line 260 of the comparator 258, and to the other side of diodes 254 and 256 via resistor 268 to the positive input line 262 of the comparator 258.

Subfeature mask CTH is connected to the true output lines of the stages of the shift register window 30 which are at a positive voltage when the register indicates that a white area has been scanned and ground when a black area has been scanned.

Thus, AND gates 220 through 230 are enabled only when each of the three inputs to the specific gate is at a positive voltage. The values of the resistors provided in mask CTH are such that if two out of three AND Gates 220 through 224 are enabled, and two out of the three AND gates 226 through 230 are enabled, comparator 258 will receive a signal on line 262 which is more positive than the signal on line 260 thereby causing the comparator to produce a positive output signal on output line 270.

It can be seen that the resistors 242, 244 and 246 in conjunction with diode 254 and resistors 248, 250 and 252 in combination with diode 256 act in conjunction with comparator 258 as two out of three majority gates. Thus, if three out of three AND gates 226 through 230 are enabled, diode 256 is cut off thereby causing the comparator 258 to be responsive to the input signals on lines 242, 244 and 246 to diode 254. Thus, as long as two out of three of the AND gates 220 through 224 are enabled, the voltage is high enough on diode 254 to cause line 262 to be higher in voltage than line 260 to the comparator 258.

Where both sets of AND gates (i.e. 220 through 224 and 226 through 230) have only two out of three AND gates enabled, the voltage provided by both diodes 254 and 256 is equal thereby maintaining a higher voltage on line 262 than on line 260, thereby causing the comparator to produce a positive output signal on line 270 which indicates a correlation of the subfeature mask to the area on the field which has been scanned.

The theory of operation of the negative feature masks such as mask CTH is best seen in connection with FIG. 6A. For purposes of detection, the mask CTH can be considered to be broken up into two portions, a first portion of which is responsive to three stages in columns 11, 12 and 13 of the shift register window and a second portion which is responsive to three stages in columns 8, 9 and 10 of the shift register window 30. Whenever all three stages in two or three out of the three rows in each of the two portions are present, the mask CTH is satisfied.

In addition to the large subfeature masks such as CTH, RTH and LMV which are provided around the periphery of the window, small negative masks are also provided which require less tolerance for correlation. The smaller masks are normally designated with either an "X" or a "Y" followed by a numeral and are responsive to either six stages of the register such as subfeatures mask X207 (FIG. 6A) or to nine stages of the shift register window such as subfeature mask Y212 (FIG. 6D).

The subfeature mask gate X207 is shown in schematic block diagram form in FIG. 11. The mask gate X207 basically comprises a pair of NAND gates 272 and 274, a NOR gate 276 and an invertor 278. NAND gates 272 and 274 each have three inputs. The inputs to NAND gate 272 are connected to stages 33,9; 34,9; and, 35,9. The three inputs to NAND gate 274 are connected to the outputs of stages 33,10; 34,10; and, 35,10. The output of each of the NAND gates 272 and 274 are connected to the two inputs of NOR gate 276, the output of which is connected to an invertor 278.

If all three of the inputs to NAND gate 272 and 274 are positive, the output of the NAND gates are ground. If any one of the three inputs to the NAND gates 272 and 274 are ground, the output of the NAND gates are positive.

If one or both of the inputs to NOR gate 276 is positive, the output of the NOR gate is ground. If both inputs to the NOR gate 276 are ground, the output is positive. The invertor inverts a ground input to a positive output and a positive input to a ground output.

Whereas the positive subfeature masks such as V100 and the negative subfeature masks such as mask CTH are connected to the true output of the stages of the shift register window, the negative mask gates such as X207 and Y212 are connected to the inverted output of the stage. That is, if the true output line is at a positive voltage, the inverted output line is at ground and vice versa. Thus, the inputs to NAND gates 272 and 274 of negative subfeature mask gate X207 are at a positive voltage if a "1" indicative of a black area is stored in the stage and the signal is ground if a "0" indicative of a white area is stored in the stage. The connection to the inverted output line of the stages is indicated in FIGS. 11 and 12 by the negative sense indicator (−) before the stage designation.

In operation, invertor 278 is enabled and provides a positive signal on its output line 280 if neither of the NAND gates 272 or 274 have all three inputs receiving a positive signal. The output signal on line 280 is ground if either of the NAND gates have all three inputs connected to positive voltage signals. Referring to FIG. 6A in conjunction with FIG. 11, it can therefore be seen that the negative subfeature mask gate X207 is enabled as long as one of the three stages in both of columns 9 and columns 10 are in the 37 0" state indicative of a white area. However, if all three stages in a column are in the "1" state indicative of a black area, no matter what the composition of the other three stages in the other column are, the mask gate X207 cannot be enabled.

Negative mask gate Y212 is shown in schematic block diagram form in FIG. 12. As will be remembered with reference to FIG. 6D, mask Y212 is a mask which is connected to nine stages of the shift register window 30. The negative mask gate Y212 is similar to negative mask gate X207 in that the gates provided therein are connected to the inverted outputs of the stages of the shift register.

Mask Y212 basically comprises three NAND gates 282, 284 and 286, a three input NOR gate 288 and an invertor 290. The operation of NAND gates 282 through 286 is like the operation of NAND gates 272 and 274. The operation of NOR gate 288 is similar to the operation of NOR gate 276. That is, if one or more of the inputs to the NOR gate 288 are positive, the output of the NOR gate 288 is ground. If all three of the inputs to NOR gate 288 are ground, the output of the NOR gate is positive.

The three input lines to NAND gate 282 are connected to the inverted output lines of stages 35,8; 35,9; and, 35,10. The three input lines of NAND gate 284 are connected to the inverted output lines of stages 36,8; 36,9; and 36,10. The input lines of NAND gate 286 are connected to the inverted output lines of stages 37,8; 37,9; and 37,10. The output lines of the three gates 282, 284 and 286 are connected to the three inputs of NOR gate 288. The output of NOR gate 288 is connected to the input of invertor 290. The output of invertor 290 is connected to output line 292.

In operation, the negative subfeature mask gate Y212 is enabled and produces a positive output signal on line 292 if none of the NAND gates 282, 284 and 286 have all of its inputs connected to a positive signal. The output signal on line 292 is ground if any of the AND gates have all three of its inputs connected to a positive signal.

It can therefore be seen in connection with FIG. 6D that mask Y212 is enabled if at least one stage in each of rows 35, 36 and 37 are in the white or "0" state. However, if the three stages in any of rows 35, 36 or 37 is in a black or "1" state, the gate cannot be enabled irrespective of the condition of the other two rows.

The difference between the X mask gates and the Y mask gates is that in the X mask gates, the inputs are grouped by columns whereas in the Y mask gates, the inputs are grouped by rows. Thus, where an X gate includes nine inputs, a third NAND gate is provided which is connected to the three rows of the third column and the NOR gate is replaced by a three input NOR gate. The NOR gate is connected like the NOR gate 288 in negative mask gate Y212. In a six input Y mask gate, only two NAND gates are provided, each of which is connected to the three stages of one row.

As hereinbefore set forth, FIG. 6A is a diagrammatic illustration of the logic for the detection of the feature 7. The feature 7 is in the instant case the top left-hand corner of an upper case character B. However, it should be understood that the feature 7 is also used in the following characters: upper case "D," "E," "F," "P," "R" and in the numeral "5."

The schematic block diagram of the feature detector for the feature 7 is shown in FIG. 13. The feature F7 detector basically comprises 10 diodes 294, each of which is connected to one of the outputs of subfeature masks or mask gates associated with the feature F7. The feature F7 detector also includes a diode 296 which is connected to the output of the top strobe 298 and a diode 300 which is connected to the output of the left strobe 302. Each of the diodes 294, 296 and 300 are connected at their other end in common to the input line 304 of invertor 306. The output of invertor 306 is connected to the input line 308 of feature F7 flip-flop 310. The flip-flop 310 also includes an input line 312 which is used to reset the flip-flop after a character has been recognized. The flip-flop 310 includes two output lines 314 and 316 which are respectively at positive and ground when a feature is recognized and at ground and positive when a feature is not recognized.

As hereinbefore set forth, subfeature masks V100, H100, X207, Y207, RTH, CTH, LTH, LTV, LNV and LBV are connected to the video shift register window as diagrammatically illustrated in FIG. 6A. It should be understood that these masks are utilized not only for the feature 7, but are also utilized for other features. Each of the feature detectors thus comprise a plurality of diodes which are connected to specific combination of subfeature masks which are required to detect the specific feature.

Diodes 294, 296 and 300 must all receive a positive signal in order to have the invertor 306 provide a ground signal to the flip-flop FF310 which sets the flip-flop thereby indicating recognition of feature F7. Thus, each of the masks V100 through LBV must be enabled at the same time that the top strobe and the left strobe 298 and 302, respectively, are enabled.

The top strobe 298 provides an enabling signal to diode 296 only when the top portion of a character is passing through the shift register window 30. Similarly, the left strobe is enabled only when the left portion of the character is passing through the shift register window 30. Thus, not only must all of the masks associated with feature F7 be enabled, but also the proper portion of the character must be in the window in order to cause enablement of the detector of the specific feature. Thus, in operation, when the enabling signal from all of the subfeature masks and the top and left strobe are provided to the inverting buffer 306, the signal on the output line 308 of the buffer goes to ground thereby causing the flip-flop to be set which is indicative of the the feature F7 having been detected. This flip-flop is thus set until such time as an entire character is recognized. Flip-flop 310 therefore acts as a storage of the feature F7. The top strobe and left strobe which were referred to in connection with FIG. 13 are provided by the horizontal and vertical analyzers.

The horizontal analyzer is illustrated in FIG. 18. The horizontal analyzer includes a horizontal counter 320, an AND gate 322, gap flip-flop 324 and logic drivers 326, 328, 330, 332 and 334. The horizontal counter 320 includes a first input line 336 which is connected to the horizontal counter to reset the count in the counter to "0." The reset line 336 is connected to the output of the computer which provides the reset signal on line 337 to start detection of a new character. The output of AND gate 322 is connected via input line 338 to the horizontal counter. The inputs of AND gate 322 are connected to a horizontal clock in the control circuitry of the system via input line 340 and to an output of gap flip-flop 324 via input line 342. Flip-flop 324 also includes an output line 347 which is connected to he central processor. The gap flip-flop 324 has its input line 344 connected to the output of the gap feature logic 346. Horizontal counter 320 also includes a plurality of output lines which are connected to logic drivers 326 through 334. A first output line 348 of counter 320 is connected to logic driver 326. Output line 348 is energized when the count in the horizontal counter is equal to "1." It should be noted that above the line 348 in FIG. 18, is the legend "HC=1." HC above output line 348 and the remaining output lines from the horizontal counter represents the horizontal count.

Thus, the output logic driver 326 is driven by the signal on line 348 when the count in the horizontal counter is at 1. The output driver 326 is connected via output line 350 to the central processor. The signal on line 350 to the computer acts as a recognition flag which signifies to the computer that it must look at the encoder. That is, after the previous character has been recognized, the computer must examine the output of the encoder to determine the character that has been recognized.

The next output line 352 of the horizontal counter is connected to the logic driver 328. The output line 352 is energized by the horizontal counter when the horizontal count is smaller than 12. Thus, during the first 11 counts of the horizontal counter, the line 352 is energized which thereby causes a driving of the output logic driver 328.

Logic driver 328 is connected via line 354 to the feature detectors and provides the left strobe signal which enables the feature detecting masks connected thereto during the first 11 counts of the horizontal counter 320. The next output line 356 of the horizontal counter is connected to logic driver 330, which is in turn connected to output line 358. Line 358 is connected to each of the feature detectors which require the center strobe signal. Line 356 is energized when the horizontal count is equal to or greater than four, but equal to or less than 16. Output line 358 thereby provides an enabling signal during the fourth through 12th count of the horizontal counter.

Output line 360 of the horizontal counter is connected to the logic driver 332 which is in turn connected to line 362. Line 362 is connected to all of the feature detectors which require a right strobe signal to enable detection of a right side feature of the character. The output line 360 is energized when the horizontal count is larger than seven. Thus, the line 362 receives an enabling signal for right side features on a count of eight or higher in counter 320.

Output line 364 of the horizontal counter 320 is connected to logic driver 334. The logic driver 334 is connected to an output line 366 which is connected to the central processor. The output line 364 of the horizontal counter 320 is energized when the horizontal count is equal to 32. When the horizontal counter reaches 32, the signal provided via line 366 to the central processor causes the central processor to provide signals to the document scanner to rescan the character.

The reason that the count of 32 is chosen is that 32 is the largest count that the horizontal counter can reach for the widest character that the character recognition system can recognize. Therefore, when the count in the horizontal counter reaches 32 and the gap is not detected signifying the end of a character, the computer automatically causes the scanner to repeat the scan of the character. If after a predetermined number of scans, the character is not recognized, the central processor generates a confusion character which indicates to the operator that an unreadable character or a character which cannot be read is provided on the document.

Line 340 to AND gate 322 is connected to the output of the horizontal clock. The horizontal clock provides a signal on line 340 after each 40 shift pulses have been provided to the video shift register. These pulses are transmitted by the AND gate 322 to the horizontal counter 320 as long as line 342 receives a positive signal from the gap flip-flop 324. The gap flip-flop 324 provides such a positive signal on line 342 as long as no gap has been detected by the gap feature logic 346.

The gap feature logic 346 includes logic for determination of an actual gap between two characters and circuitry which is responsive to the determination that a character has been completed by the detection of certain right side features of characters. Thus, upon the determination of either an actual gap or the right side features of a character, the gap feature logic provides a signal on line 344 which sets the gap flip-flop 324 thereby providing a positive signal via output line 347 to the central processor which indicates the trailing edge and causes examination of the encoder, and a ground signal via line 342 which prevents further clock pulses from the horizontal clock to be fed to the horizontal counter. The horizontal counter 320 is then reset by the computer via line 336 when the next character is scanned.

It should be noted that the detection of a gap whether actual or by means of the detection of the right side features of a previous character occurs after the trailing edge of a character passes the seventh column of the video shift register 28. The leading edge of the binary quantized pattern of the next character has started to be inserted in the shift register. When the horizontal counter 320 reaches the count of one, the leading edge of the next character is in the seventh column of the shift register.

It can therefore be seen that the scanning pattern does not retrace or return to the beginning of the next character. That is, the scanner continues sequentially taking columns of samples along a line. As a gap between characters is detected, the horizontal analyzer starts a new cycle for the detection of the next character yet the document scanner is not affected in its progression along the line unless a character has not been recognized or the end of a line is reached.

The gap feature logic 346 includes a plurality of gap masks for detection of an actual gap which are similar in form to the subfeature mask V100. A first of the gap masks is responsive to a vertical line along columns 6 and 7 of the shift register. The mask includes four OR gates which are connected respectively to the following pairs of stages 34,7 and 34,6; 35,7 and 35,6; 36,7 and 36,6; and, 37,7 and 37,6. For correlation of this mask, the resistors in the circuit are chosen to enable the comparator only if the four OR gates are enabled.

A second gap mask is provided to detect the condition where a horizontal line is provided between columns 4 to 9 of the window. Thus, six OR gates are connected to the following stages, respectively: 35,9 and 36,9; 35,8 and 36,8; 35,7 and 36,7; 35,6 and 36,6; 35,5 and 36,5; and, 35,4 and 36,4. The resistances provided in this mask cause the comparator to be enabled when four out of six of the OR gates are enabled.

Each of the output lines of these gap Whenever are connected via an OR gate to a flip-flop which is set when either of the masks is satisfied. Whenever the flip-flop is set during a vertical roll through, it indicates that no gap has occurred. That is, either a horizontal or vertical line has been detected. The term "roll through" indicates that a character pattern has been shifted through the entire 40 rows of the shift register. If this flip-flop has not been set at the end of the vertical roll through, it indicates that a gap has occurred.

After each roll through, the flip-flop connected to the output of the gap mask is reset. Where the flip-flop has not been set, indicating that a gap has been detected, the gap feature logic detector 346 provides a signal via line 344 to gap flip-flop 324 which changes the state thereof. No further horizontal clock pulse can then step counter 320 because the AND gate 322 is disabled.

Upon the start of the next character, both the flip-flop in gap feature detector 346 and flip-flop 324 are reset. The gap feature detector then examines the next character for an actual gap.

The vertical analyzer is shown in FIG. 19. The vertical analyzer basically comprises a vertical counter 370 which is connected to four logic drivers 372, 374, 376 and 378 via output lines 380, 382, 384 and 386, respectively. The vertical counter 370 also includes an input line 388 which receives shift pulses as shift register 28 is shifted.

A second input line 390 is provided which is connected to the horizontal clock to provide a reset pulse after each 40 pulses from line 388. Therefore, the vertical counter 370 is stepped through 40 counts before it is recycled by the reset pulse on line 390.

Line 380 is energized when the vertical count in the counter 370 is larger than or equal to 37 but smaller than five. The legend "VC" provided above lines 380 through 386 refers to the vertical count. Line 382 is energized when the vertical count is larger than or equal to five, but smaller than 11. The line 384 is energized when the vertical count is greater than or equal to 11, but smaller than 19 and the line 386 is energized when the vertical count is larger than or equal to 19, but smaller than 27.

The output logic driver 372 is connected via line 392 to the feature detectors which require the subbottom strobe. Logic driver 374 is connected via line 394 to the feature detectors which require the bottom strobe. Logic driver 376 is connected via line 396 to the feature detectors which require the middle strobe and logic driver 378 is connected via line 398 to the feature detectors which require the top strobe.

It can therefore be seen that the horizontal and vertical analyzers effectuate the feature logic only during the periods or areas in which specific feature detectors examine the character. This strobing within predetermined periods, in effect, assigns or provides the features detected with an address within the character itself.

The periods of the strobe enabling signals are long enough to provide sufficient latitude in the detection of the various features so that specific shapes of features can be accurately defined during detection. That is, since the relative location of a character subfeature within the character is not held within rigid requirements, the shape of the subfeature mask can be more specifically defined since the subfeature has room to be fitted into correlation within the mask.

The count of one in the vertical counter 370 of the vertical analyzer coincides with the horizontal alignment of the character pattern in the shift register 28. That is, the bottom row of samples generated by the quantizer 24 are located in row 40 of shift register 28.

It should be remembered that the bottom edge of a line of characters is preferably provided in row 30 of the shift register. Where a character includes a subbottom feature, the lowermost edge of the character extends below the bottom of the line. Therefore, in order to provide enough vertical latitude to detect subbottom features, the subbottom strobe signal is enabling from the count of 37 in the vertical counter. Effectively, this means that the subfeature detectors are enabled when the bottom edge of a line of characters is in row 27. Thus, if the subbottom feature is unusually low, the feature is still detected because of the latitude provided by the analyzers to the location of the features of the characters.

Figure 6B:
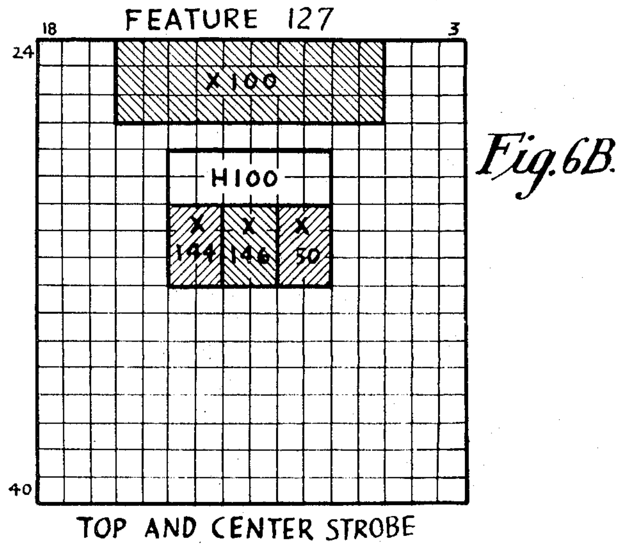
Figure 6E:
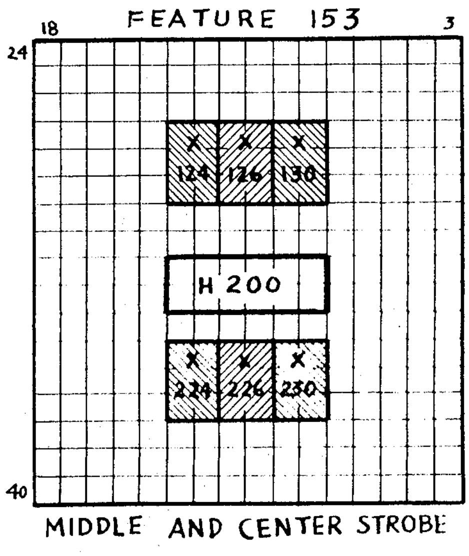
Figure 6C:
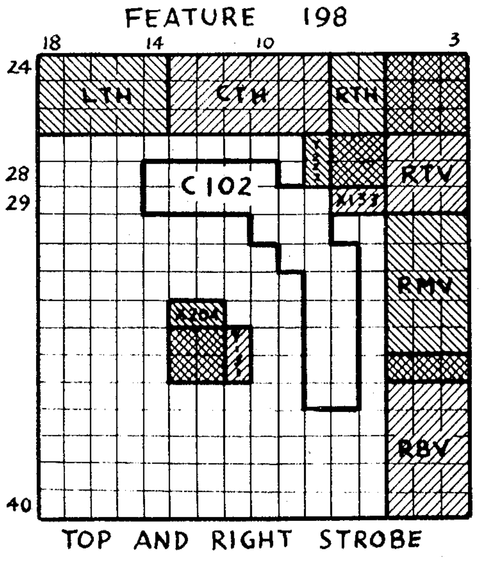
Figure 6F:
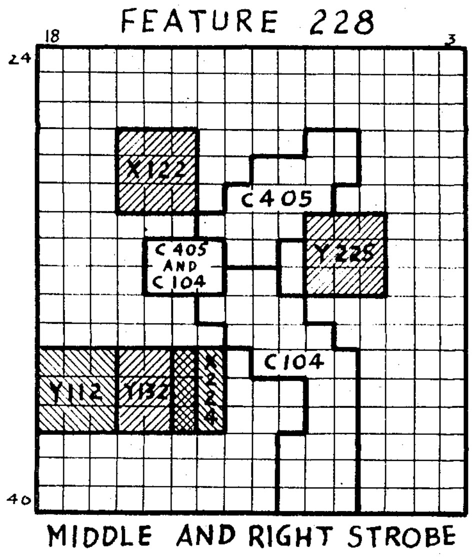
Figure 6H:
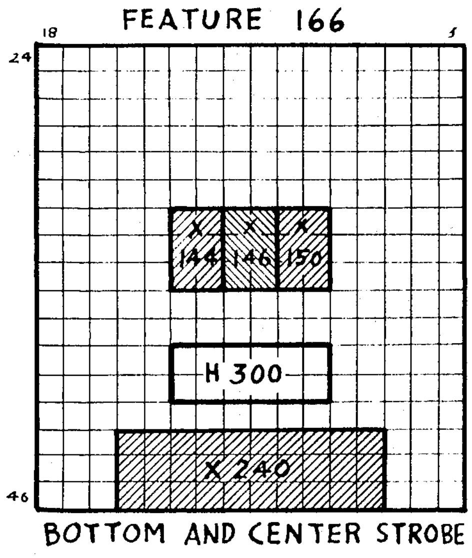

Referring back to FIG. 6, it can be seen in FIG. 6A that feature 7 is detected when the top and left strobe signals are provided to the feature 7 logic as well as each of the subfeature masks being enabled simultaneously. FIG. 6B is a diagrammatic illustration of the feature logic for feature 127. As indicated by the legend at the lowermost portion of 6B, the feature 127 is detected only during the enablement of the top and center strobe. FIG. 6C is a diagrammatic illustration of the feature logic for feature 198 which as indicated by the lowermost legend in the figure can be enabled only when the top and right strobe are present. FIG. 6D is the diagrammatic illustration of the feature logic for feature 45. Feature 45 can be detected only when the middle and left strobe are present. Similarly, as indicated in FIGS. 6E through 6I, feature 153 can be detected only during enablement of the middle and center strobe, feature 228 can be detected only during the enablement of the middle and right strobe, feature 115 can be detected only during the bottom and left strobe, feature 166 can be detected only during the bottom and center strobe, and feature 264 can be detected only during the bottom and right strobe.

As hereinbefore mentioned, FIGS. 6A through 6I comprise the nine feature masks that detect positive features in the upper case character "B." Because each feature is detected independently of the remaining features, an L-shaped feature is readily distinguishable from a curved feature having both a horizontal and vertical component which is connected by a curved intermediate portion.

Referring now to FIGS. 7A, 7B and 7C wherein the feature logic for the left side features of the character "8" are diagrammatically illustrated. The right side and central features of the figure "8" are otherwise similar to the character "B." It can therefore be seen that the essential difference between the character "B" and the character "8" are all in the left side features. In prior character recognition systems, the important area in the character "8" that could be distinguished from the upper case character "B" was in the middle left portion of the character. However, in the character recognition system embodying the invention, feature extraction enables the distinguishment in three specific areas between the character "8" and the upper case character "B."

Figure 6G:
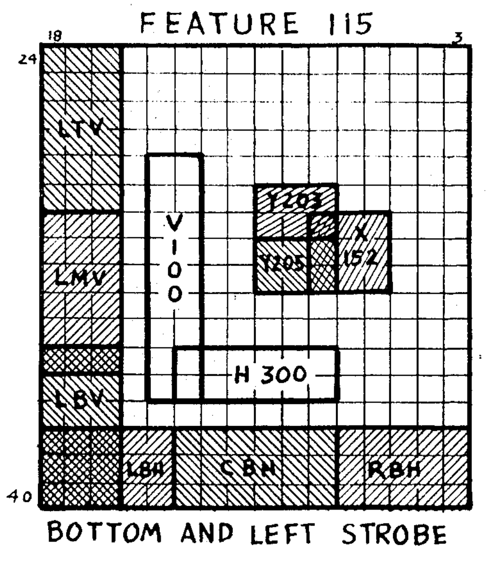
Figure 6I:
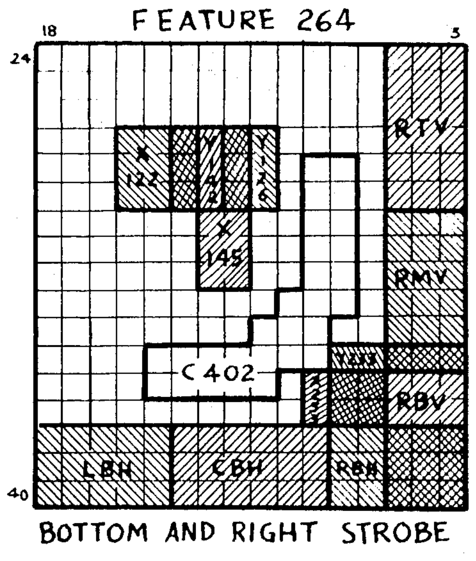

Referring to FIGS. 8A and 8B, the logic for the feature detectors for the feature "8" and feature 117 are diagrammatically illustrated therein. Feature "8" which is illustrated in FIG. 8A in diagrammatic form is a serifed top left feature. That is, in a serif font, the upper case character "B" includes a serif in its upper left-hand corner. The mask provided in addition to H100 and V100 in order to detect the serif, is positive mask H106 which includes dots in the boxes which correspond to the shift register stages that the mask H106 is connected to. The dots in the boxes are provided to distinguish the extra positive subfeature mask which has been added to the positive masks in feature 7. Feature "8" is also detected during the top and left strobe. Feature 117 which is diagrammatically illustrated also includes a serif subfeature which is provided in addition to the positive subfeatures V100 and H300 in feature 115 (FIG. 6G). Subfeature mask H304 also includes dots to distinguish the extra positive subfeature from the other positive subfeature masks.

A portion of the feature storage register is shown in FIG. 14 in schematic block diagram form. The feature storage register includes a plurality of flip-flops one for each of the features which are used within the various fonts of type that the central processor and character recognition system are programmed to detect.

FIG. 14 depicts the flip-flops which are used for the storage of features F7, F8, F115 and F117. These flip-flops are, respectively, 312, 400, 402, and 404. The true output of each of the flip-flops 312, 400, 402 and 404 are connected to driver gates 406, 408, 410 and 412. The inverted outputs of flip-flops 312, 400, 402 and 404 are connected to logic drivers 414, 416, 418 and 420.

Gates 406, 408, 410 and 412 are connected via lines 100 to the font characteristic register 56. Gates 406 and 410 are connected via the sansserif enable line to the font characteristic register 56 and gates 408 and 412 are connected via the serif enable line to the font characteristic register 56.

Therefore, if the font recognition logic has determined that the character recognition system is looking at a serif font of type, the gates 408 and 412 are enabled to provide an output signal in accordance with the output of the flip-flops 400 and 404 to output lines F8 and F117, respectively, if these features have been detected. Conversely, if a sansserif font of type has been detected by the character recognition system, the serif enable line enables gates 406 and 410 to pass an output signal from flip-flops 312 and 402 to output lines F7 and F115, respectively. It should be noted that the signals on the output lines from the gates 406, 408 410 and 412 are ground if the features F7, F8, F115 and F117, respectively, are recognized.

The output lines from the logic drivers 414, 416, 418 and 420 are ground if the features F7, F8, F115 and F117 are not recognized.

It should also be understood that each of the feature detectors that are provided have a flip-flop associated with them to temporarily store the information relating to the detection of the feature. Each of the flip-flops are connected to true and inverted output lines via buffer gates and logic drivers. Gates are provided where the feature may not be present in a particular font. Thus, where an output line from the driver gates and logic drivers includes a legend having a numeral preceded by an "F," (e.g. F7, F8, F115 and F117), it indicates the true feature line output signal and if the line includes the numeral preceded by an "F" with a line thereover (e.g. $\overline{F7}$, $\overline{F8}$, $\overline{F115}$ and $\overline{F117}$), it indicates the inverted output signal from the feature flip-flop.

Each of the feature flip-flops is also connected to a reset line. The reset line is pulsed to reset all of the feature registers that were set after a character has been recognized. If a character has not been recognized, the outputs of the feature register continue to be examined until a decision has been reached by the central processor.

The threshold decoder for the upper case character "B" is illustrated in schematic form in FIG. 15. The threshold decoder for the upper case character "B" comprises a plurality of diodes 430 through 452 which are connected at one side to a common buss 454 which is in turn connected to the negative input line 456 of an analog comparator 458. The analog comparator 458 includes a positive input line 460 which is connected to the output of majority register 52. As will hereinafter be seen, the signal provided on line 460 determines the level of correspondence between the feature detectors and the features of the character scanned for decoding the same.

Diodes 430 through 446 and 450 are connected at their other side to diodes 462 through 478 and 480, respectively.

Diode 448 is connected at its other side to a pair of diodes 482 and 484 and diode 452 is connected at its other side to a pair of diodes 486 and 488. Diode 462 is connected to line $\overline{F101}$, diode 464 is connected to line $\overline{F60}$, diode 466 is connected to line $\overline{F29}$, diode 468 is connected to line F264, diode 474 is connected to line F166, diode 476 is connected to line F153, diode 478 is connected to line F127, diode 482 is connected to line F115, diode 484 is connected to line F117, diode 480 is connected to line F45, diode 486 is connected to line F7 and diode 488 is connected to line F8.

The diodes 430 through 452 are also connected at their other side to a positive source of voltage (+v. DC) via resistors 490 through 512, respectively. Buss line 454 is connected via a resistor 514 to ground. The analog comparator 458 is enabled when the signal on line 456 is more negative than the signal on line 460. The enablement of the comparator 458 provides a positive voltage signal on the output line 516 of the analog voltage comparator. If the signal on line 456 is more positive than the signal on line 460, the output signal on line 516 is ground.

In operation, the threshold decoder for the upper case character "B" is enabled when a predetermined number of the features required in the character "B" are detected. The operation of the circuit is best understood with reference to FIG. 16. The feature register is diagrammatically depicted therein at 520 for each of the features considered in connection with the detection of the character "B." The upper case character "B" decoder recognizes the character "B" if each of the features illustrated within the boxes 522 of the register 520 are present. For each of the features which are examined, there is provided in the top row the sense in which the feature provided therebelow is examined. The provision of a "+" in top row of register 520 indicates that the detection of the feature is required. The provision of a "−" sign in the box in the top row of the register indicates that it is the absence of the character which is required.

Thus, as seen, the rightmost three features which are required are the features in the left side of a character "8." Therefore, rather than requiring their presence, the absence of these features is required. Each of the features which are illustrated within the boxes 522 of the register 520 are provided in the row and column of boxes in which the horizontal analyzer and vertical analyzer provide strobes to their respective feature detectors. That is, features F115 and F117 are sensed when the bottom and left strobes are provided to the feature detectors for features F115 and F117. It should be noted that if either feature F115 or F117 is present, the bottom left feature of the upper case character "B" is present. Similarly, if either feature F7 or F8 is present, the top left side feature of the upper case character "B" is detected.

Returning to FIG. 15, it should be noted that the two diodes 448 and 452 are each connected to an OR gate comprised of diodes 482 and 484 and 486 and 488, respectively. Thus, if either F115 or F117 is ground, the ground signal is provided to the input of diode 448. Similarly, if either F7 or F8 is at ground, then the input to diode 452 is at ground. Where correlation or enablement of each feature detector connected to the threshold decoder for the upper case character "B" is required, the voltage to line 460 of comparator 458 is provided at a level which is more positive than the signal on line 456 when all of the features are present. If, however, all but one feature is required, the level provided on line 460 is intermediate that of the signal provided on line 456 when one feature is missing and when two features are missing. Similarly, if all but two features are required, the voltage level provided to line 460 is intermediate that voltage provided to line 456 if two features are missing and if three features are missing.

It should be noted that the provision of the programmable threshold level enables the determination of a character where various features have not been detectable for one reason or another. Also, where no characters are detected during a character scan, the character can be looked for with the closest correlation by lowering the correlation level provided to all of the threshold decoders for all of the characters.

Thus, the probability of not recognizing a character or confusion in characters detected is substantially reduced.

The connection of the character decode matrix to the encoder matrix is illustrated in FIG. 20. The encoder includes a plurality of driver gates 600 which are connected to an encoder matrix 602. A driver gate is provided for each of the characters which can be recognized by the character decode matrix 50. Thus, driver gates are provided for each of the upper case characters "A" through "Z," each of the lower case characters *a* through *z*, each of the numeric characters "0" through "9" as well as any special characters such as editing symbols, instruction symbols, etc. which may also be recognized by the character decode matrix. The output lines from the threshold decoders for the various characters are labeled "A Recognized," "B Recognized," etc.

Also connected to each of the driver gates 600 are lines from the data select register 54. In order to enable the driver gate 600 in order to pass the signal from the threshold decoder to the encoder matrix, the character must be one which is selected for use or recognition in the system. Thus, if a lower case character *a* is recognized and only the upper case select lines are energized, the driver gate 600 associated with the lower case *a* recognized does not pass a signal to the encoder matrix and therefore does not encode the character. It should therefore be noted that the driver gate 600 associated with the upper case characters "A" through "Z" are each connected to the upper case select line. Similarly, each of the driver gates 600 associated with the lower case characters are each connected to the lower case select line. Finally, each of the driver gates 600 which are associated with the numerical characters are connected to the numeric select line. Similarly, special characters are connected via special character select lines to the data select register (not shown).

For each recognition line to a driver gate 600, there is an inhibit line which is also connected to the driver gate 600. Each of the driver gate inhibit lines are signified by a circle at the junction of the line with the gate. Thus, the gate associated with the "A Recognized" line includes a "A" inhibit line and so on. The encoder matrix 602 converts the signal on one line to a 12 bit character code. That is, if the character "A" is recognized, the uppermost driver gate 600 provides a driver signal on one line to the encoder matrix 602. The energization associated with the character "A" being recognized causes the encoder matrix to generate a 12 bit binary coded character representative of the character "A."

Where two characters have been recognized, two input lines to the encoder matrix are enabled thereby causing a superimposition of one character code over the other. Therefore, if the character code for the first number is 100000000001 and the 12 bit character code for the other line enabled is 010000000001, the resulting output code from the encoder matrix is as follows: 110000000001. Since this character code would not be representative of either of the characters recognized, it is therefore necessary to determine which characters were recognized by the character decode matrix. A plural input detector is provided in the encoder to recognize that more than one of the driving gates 600 is enabled.

The two characters which were detected are identified by the computer by providing sequentially the "A" inhibit, the "B" inhibit, etc. until the output code of the encoder changes. That is, as soon as one of the two characters which were recognized is inhibited, the code changes to the code of the other character. Similarly, when the other character is inhibited, the code changes to the first character. In this way, the central processor can detect which two characters were simultaneously detected. The central processor can then cause either a rescan to look more diligently for distinguishing features between the two characters or identify the character from the context in which it is used.

The vertical data column and its associated circuitry within the vertical analyzer is shown in FIG. 17. The vertical data column basically comprises a shift register 700 and an OR gate 702. Shift register 700 is a 40 bit shift register having an input line 704 which receives shift pulses at the same time that the video shift register 28 is shifted.

A second input line 706 to the shift register 700 provides the binary bits which are inserted into the shift register. The shift register includes an output line 708 which is the output of bit 40 of the shift register and which is connected to a vertical height counter 710 and to the first input line 721 of OR gate 702. The second input line 714 of OR gate 702 is connected to the output of stage 40,3 of the shift register window 30.

The vertical data column 700 provides a profile of the height of a character. That is, as the video shift register 28 is shifted, ultimately each signal of the binary quantized signal which passes through the shift register 28 ultimately passes through stage 40,3 of the shift register window. Since the vertical data column shift register 700 is 40 bits long, and since each column in the video shift register is shifted along, the shift register 700 is horizontally synchronized or aligned with the shifting of data bits therethrough.

In operation, the vertical data column shift register 700 is cleared by a signal provided on input line 716 to the vertical data column shift register 700. Line 716 is connected to the output of the central processor which clears the shift register 700 prior to the determination of the character profile. As the new character progresses past stage 40,3 of the shift register window, the binary bit therein is provided via line 714 to the OR gate 702. As the first column of binary bits is passed through stage 40,3 of the shift register window, the vertical data column shift register 700 receives the same bits via line 706 and this stores within the 40 bits of the vertical data column shift register 700, the same information that is in the fourth column of the video shift register 28. That is, since the shift register 700 was cleared by the signal on line 716 each of the bits in the shift register 700 were "0" thereby providing "0"s via line 708 and line 712 to the OR gate 702. Therefore, unless a "1" bit was provided via line 714 from the stage 40,3 of the shift register window, a "0" is placed in bit "1" of shift register 700. Therefore, the bit provided to line 706 is like the bits provided on line 714. If the "0" bit is provided to line 714, the OR gate is not enabled thereby providing a "0" bit to line 706. If a "1" bit is provided via line 714, the OR gate 702 is enabled thereby providing a " 1" bit to 706.

After the first column of bits has been provided via line 714 to the OR gate 702, the OR gate 702 receives "1" bits not only from the "1" bits provided in the third column of the video shift register 128 but also from the "1" bits that are presently stored in the vertical data column shift register 700. Thus, if the height of a character is 25 bits high, and the vertical data column 700 ultimately is provided with a string of 25 consecutive "1" bits in the shift register 700.

It can therefore be seen that if there is at least one "1" bit in any row of the shift register 28, there is a "1" in the bit of shift register 700 corresponding to the row. After the complete character profile has been stored in the shift register 700, the vertical height counter 710 receives the output bits via line 708 from the shift register 702.

The vertical height counter includes a binary counter which is stepped each time a "1" is received from the vertical data column shift register 700. The output of the vertical height counter 710 is then provided via line 718 to the logic 720 of the vertical analyzer.

The information provided on line 718 is ultimately used to determine whether an upper or a lower case character has been detected where the characters are otherwise identical. That is, since an upper case character is vertically longer than a lower case character, the logic 720 is capable of determining by the vertical count whether an upper or lower case character has been detected.

The output of the vertical data column shift register 700 is also connected via lines 722 to line follow logic 724 in the vertical analyzer 40. The line follow logic 724 is provided in order to prevent the scanning raster of the document scanner from leaving a line of type.

Theoretically, a line of type on a document is perfectly horizontally aligned. In practice, however, a line of type on a document very often varies from the exact horizontal disposition on the document. Thus, as the scanner proceeds along a horizontal line on the document, where the line on the document is not perfectly horizontally aligned, the scanner ultimately starts scanning either higher or lower on the characters as the scanner progresses along the line.

As hereinbefore mentioned, it is preferable to maintain or normalize the character size at approximately 25 samples high. It is also preferred that the character be five samples from the top of the scan and ten samples from the bottom of the scan. It is a necessity that the entire character be provided within the scan, whether it be an average character or not. Therefore, if a "1" bit is detected in either the first bit or the 40th bit of the 40 bit shift register 700, there is a probability that the character is out of the top or bottom of the scan.

The line follow logic therefore includes three output lines 726, 728 and 730 which are connected to a register 732 which stores the information provided on lines 726, 728 and 730. Line follow logic 724 provides a signal on line 726 when the "1" bits in the shift register 700 are too close to the top of the shift register. That is, if more than 10 bits at the left end (e.g. bits "31" through "40") of the shift register 700 are "0," it indicates that the scan is too low and the character too high within the scan. Therefore, line 728 is provided with the signal to indicate that the scan is low. Correspondingly, if the number of "0" bits in the leftmost bits of the shift register 700 are less than 10, it indicates that the scan is too high. Therefore, a signal on line 726 is provided to the register 732 to indicate this condition. Also, if either bit "1" or " 40" is in the "1" state, line 730 is provided with the signal from the line follow logic 734 which indicates that the character is out of the top or bottom of the scan.

The register 732 is connected via lines 734, 736 and 738 to the central processor. The central processor upon receipt of the information from lines 734, 736 and 738 provides signals via lines 124 to the document scanner to either lower or raise the scan for the next character. Thus, as the scanner proceeds along the line, the central processor continuously checks the output of the line follow logic 724 to determine whether the scan should be raised or lowered in order to properly scan the characters.

The central processor also retains the location of the first character in the line so that the scanner is returned to the proper position when the first character in the next line is scanned.

It can therefore be seen that a new and improved character recognition system has been provided herein. The character recognition system utilizes feature extraction which utilizes only a preselected portion of the video shift register. That is, only 272 of the stages of the 720 stages of the video shift register 28 are utilized in the determination of each of the features in a character. The 272 stages referred to form the shift register window which enables a detailed study of each of the portions of a character as the character is shifted through the shift register in a binary quantized form.

The features are detected independently of each other within a character thereby enabling a more detailed study of specific shapes of features.

Thus, a variance in the size of the loops in such characters as lower case *a*, *b*, *d*, *g* and upper case characters "B," "P" and "R" does not prevent the recognition of these characters when they are scanned. Moreover, where two characters are very similar, the distinguishment between the two characters is enhanced in that each of the features in the character can be examined more carefully thereby providing a larger Hamming difference between the characters for purposes of recognition.

Because of the capability of distinguishing more differences between even the closest of characters, where a feature is not recognized, it is not necessary to discard all of the remaining features in a character which have been detected in that the majority register 52 is programmed by the central processor 64 to provide a signal via line 112 which enables the recognition of the character with less than all of the features detected.

Moreover, the distinguishment between characters of similar shape is further enhanced by the utilization of the failure to detect the features in the closely similar character which are not like those in the character examined.

As seen with respect to the upper case character "B" decoder, not only are the features which are in the character "B" required, but also the absence of the features in the character "8" which are different from those in the upper case character "B."

Another advantage of the character recognition system embodying the invention is the provision of the vertical data column which enables detection of the height of a character within a scan as well as the location therein. Thus, if the character is too long, the central processor enlarges the size of the scan thereby normalizing the character within the scan to be 25 samples long. Moreover, the vertical data column enables the following of a line which is not perfectly horizontally aligned on a document. In this manner, a line which is skewed can be read by the character recognition system. The central processor is able to continually update the location of the scanner to maintain the characters in the line within the scan. The character recognition system further includes means for withdrawing only information required from a document That is, the data selection register 54 enables only the recognition and encoding of the character which are desired. Thus, if only upper case characters are to be distinguished and read from a document, only the upper case character enable signals are provided by the data select register to the encoder 62. Similarly, after it has been determined that a font which is used on a document is either a serif or a sansserif font, the character recognition circuitry is inhibited from accepting any features from a font which is not being used.

Without further elaboration, the foregoing will so fully illustrate my invention that others may, by applying current or future knowledge, readily adapt the same for use under various conditions of service.

We claim:

1. A character recognition system comprising means for scanning fields on a document, a video shift register having a plurality of stages for serially storing and shifting a binary quantization of a character pattern sampled within said field on said document and a mask matrix comprising a plurality of gates each connected to a different combination of said video shift register stages wherein the improvement comprises connecting said gates only to selected ones of said video shift register stages which correspond to an area of said document field, said gates being enabled continuously to sense predetermined binary combinations in said video shift register as said binary quantization is shifted through said video shift register, feature extraction logic comprising a plurality of feature detectors each of which is connected to a different combination of said mask matrix gates, timing means connected to said feature detectors to enable each detector only during a predetermined time interval related to the location of the feature associated with the respective feature detector within a character, said timing means enabling said features to be detected by said feature detectors only during the time interval in which the respective feature passes through said selected ones of said video shift register stages, and a vertical data column, said data column comprising a recirculating shift register having a plurality of stages equal in number to the number of samples taken in the vertical column within a field, said video shift register and said recirculating shift register each being responsive to shift pulses provided at the same rate, input means for the recirculating shift register being responsive to the signals of one stage of said video shift register so that as said character pattern passes through said one stage of said shift register, the vertical profile of said character pattern is inserted in said recirculating shift register, means responsive to signals from said recirculating register for determining the position of said character within a scanned field, said scanning means responsive to signals from said position determining means so that the position of said scanning means is moved if said character is not in a preferred position of said field.

2. The character recognition system of claim 1 wherein a plurality of character decode gates are provided which are connected to different combinations of said feature detectors, for the recognition of characters in accordance with the presence and absence of combinations of character features.

3. The character recognition system of claim 2 and further including storage means to which said feature detectors are connected, said storage means being connected to said character decode gates, the latter being in turn connected to different combinations of said storage means so that said characters are recognized in accordance with said presence and absence of said combinations of character features.

4. The character recognition system of claim 2 wherein said character decode gates include means to lower the number of features required to recognize said characters, said lowering means enabling the recognition of said characters wherein less than all of said features have been detected.

5. The character recognition system of claim 1 wherein said feature detectors are responsive both to mask matrix gates that are responsive to lines on said document and to mask matrix gates that are responsive to blank portions on said document.

UNITED STATES PATENT OFFICE

CERTIFICATE OF CORRECTION

Patent No. 3,613,080 Dated October 12, 1971

John A. Angeloni, Sr.,
John McIntyre and
Ronald L. Baracka

It is certified that errors appear in the above identified patent and that said Letters Patent are hereby corrected as shown below:

(1) Column 3, Line 39 "s" should be --is--.

(2) Column 3, Line 58 "here" should be --there--.

(3) Column 11, Line 36 "and" second occurrence should be --of--.

(4) Column 12, Line 29 "subfeatures" should be --subfeature--.

(5) Column 12, Line 71 "37 0" should be --"0"--.

(6) Column 14, Line 45 "he" should be --the--.

(7) Column 16, Line 18 delete the word "Whenever".

Signed and sealed this 18th day of April 1972.

(SEAL)
Attest:

EDWARD M.FLETCHER,JR.
Attesting Officer

ROBERT GOTTSCHALK
Commissioner of Patents